United States Patent [19]

Yamada et al.

[11] 4,145,736
[45] Mar. 20, 1979

[54] MICROPROGRAM CONTROL DEVICE

[75] Inventors: Takahiko Yamada, Tokyo; Shigeki Yamada, Tokorozawa; Yoshio Sakurai, Tokyo; Kazuo Furukawa, Yokohama; Syoji Kajitsuka, Tokyo; Toshio Awaji, Sagamihara, all of Japan

[73] Assignees: Nippon Telegraph and Telephone Public Corporation; Nippon Electric Co., Ltd.; Hitachi, Ltd.; Oki Electric Industry Co., Ltd.; Fujitsu Limited, all of Japan

[21] Appl. No.: 768,089

[22] Filed: Feb. 14, 1977

[30] Foreign Application Priority Data

Feb. 17, 1976 [JP] Japan .................................. 51-15414

[51] Int. Cl.² ........................... G06F 9/16; G06F 9/18
[52] U.S. Cl. .................................................. 364/200
[58] Field of Search ... 364/200 MS File, 900 MS File, 364/200, 900

[56] References Cited

U.S. PATENT DOCUMENTS

| 3,868,649 | 2/1975 | Sato et al. | 364/200 |
| 3,972,024 | 7/1976 | Schroeder et al. | 364/200 |
| 3,972,029 | 7/1976 | Bailey, Jr. | 364/200 |

Primary Examiner—Gareth D. Shaw
Assistant Examiner—Thomas M. Heckler
Attorney, Agent, or Firm—Burgess, Ryan and Wayne

[57] ABSTRACT

A control device which controls a plurality of controlled devices by time shared control in a microprogram control system and has one control memory, a plurality of microinstruction registers, the outputs of which are applied to the controlled devices, circuits for memorizing microinstruction execution requests corresponding to microinstruction type and the controlled devices, and a selecting circuit for selecting a microinstruction register for storing a microinstruction read out from said control memory in each machine cycle and the controlled devices to be controlled. The field of the microinstruction indicates the execution and type of the next microinstruction after the next machine cycle to a given controlled device. When the execution of the next microinstruction is indicated, this request and the microinstruction type are memorized by microinstruction request holding circuits corresponding to the controlled circuits respectively and any selected controlled circuit, and the microinstruction is read out of the control memory. Consequently, the instruction stored in one microinstruction register may control one controlled circuit while other instructions stored in the other microinstruction registers may control the other controlled circuits in time-shared parallel relationship.

4 Claims, 30 Drawing Figures

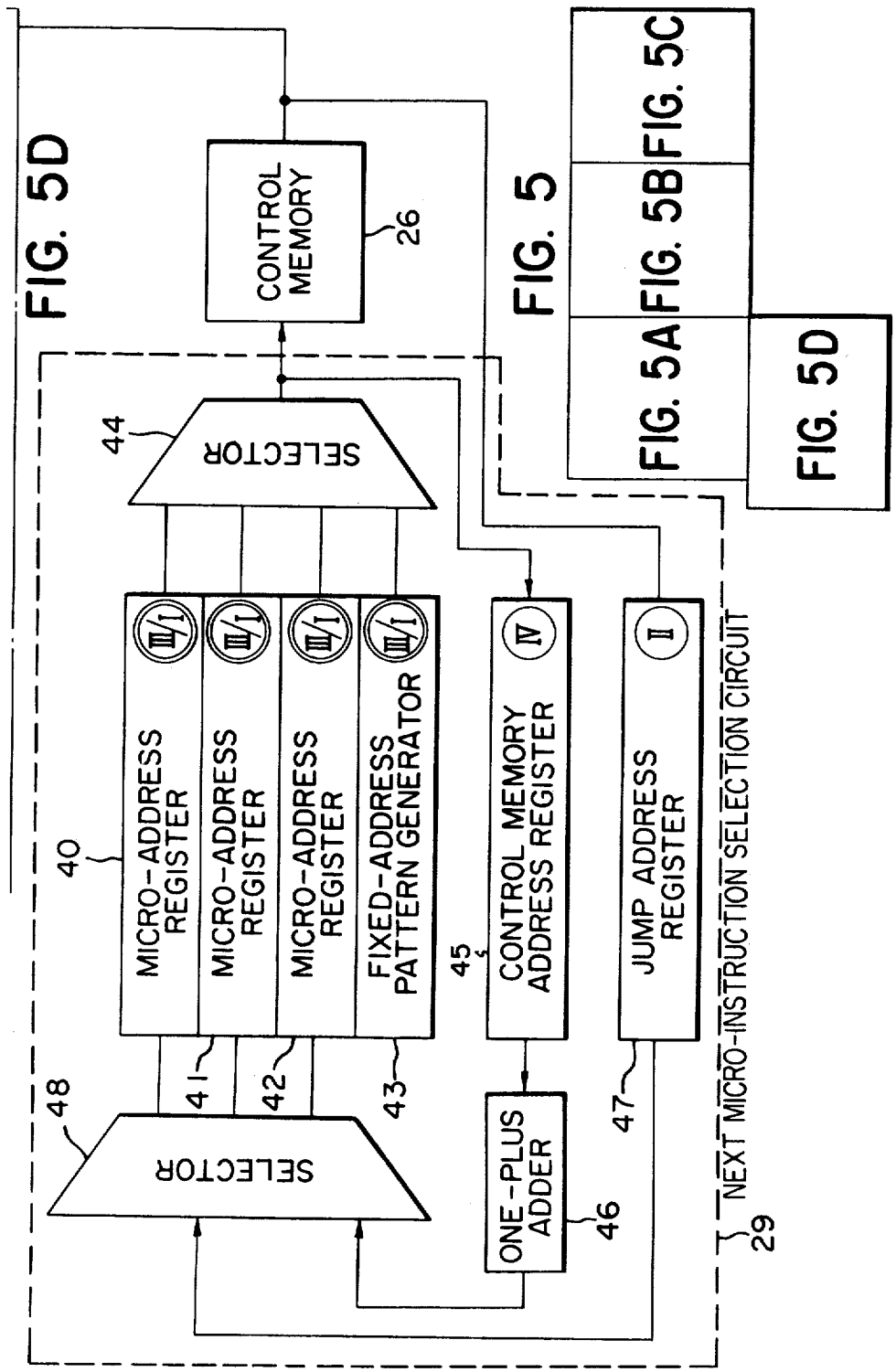

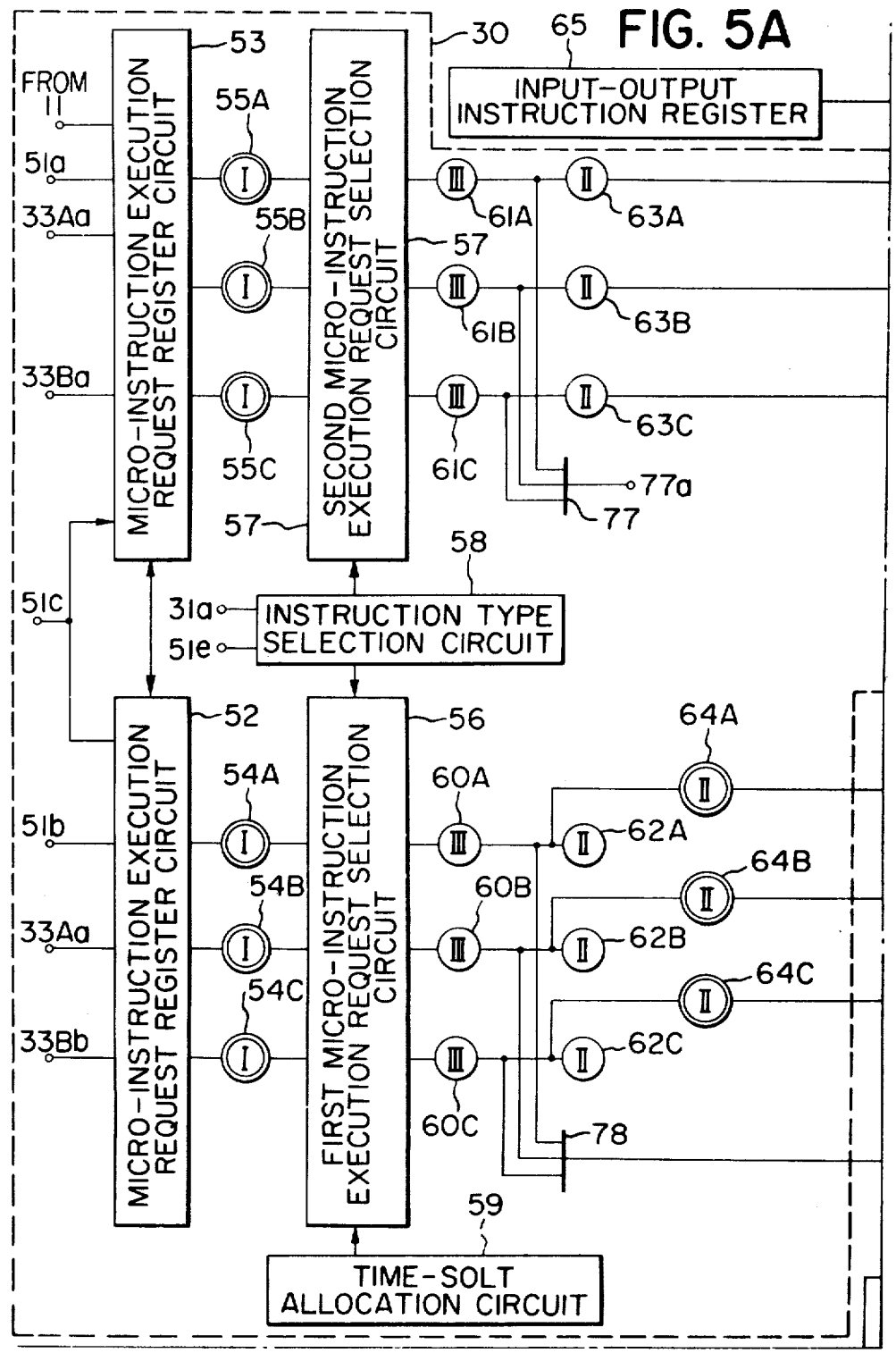

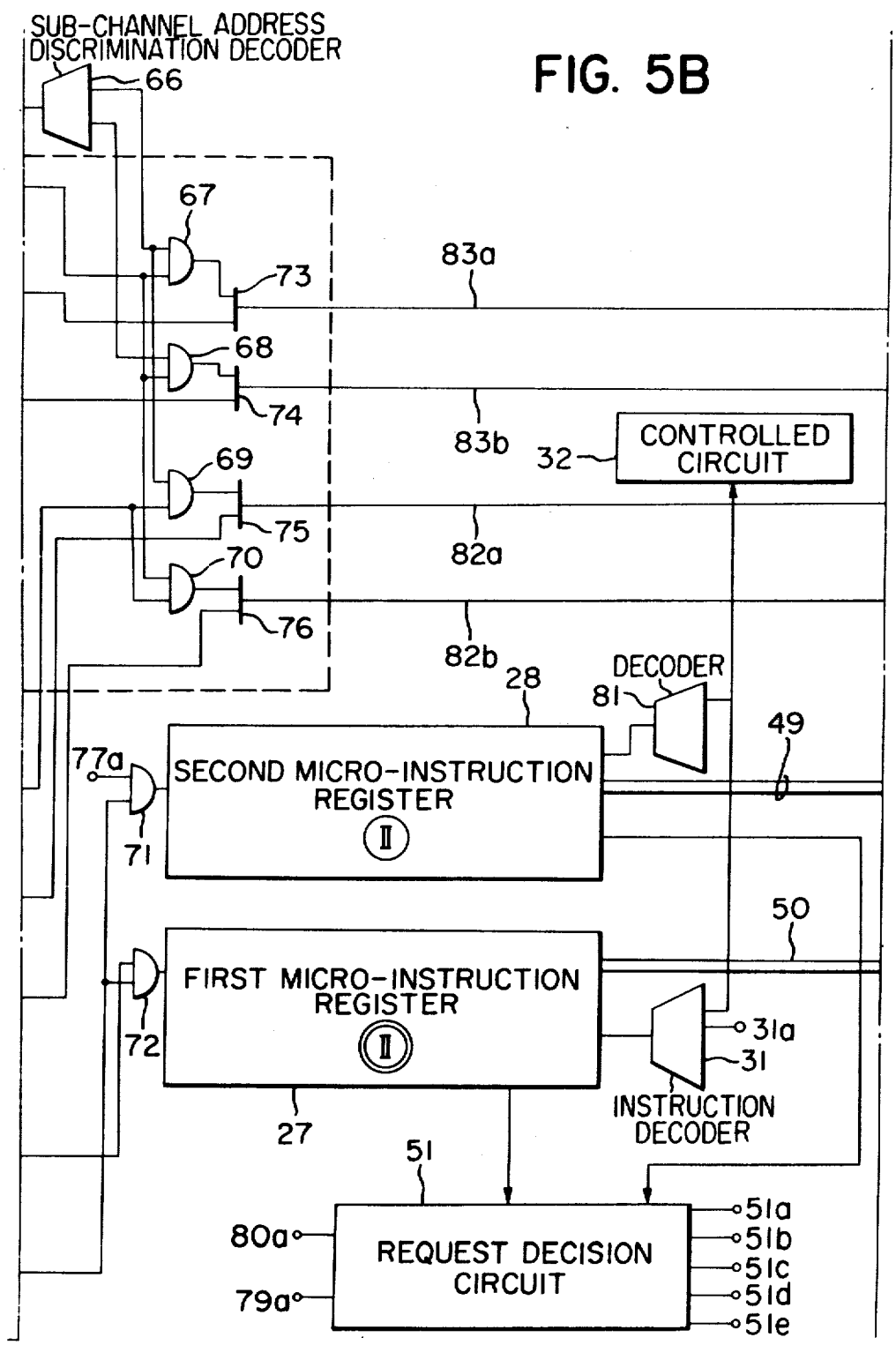

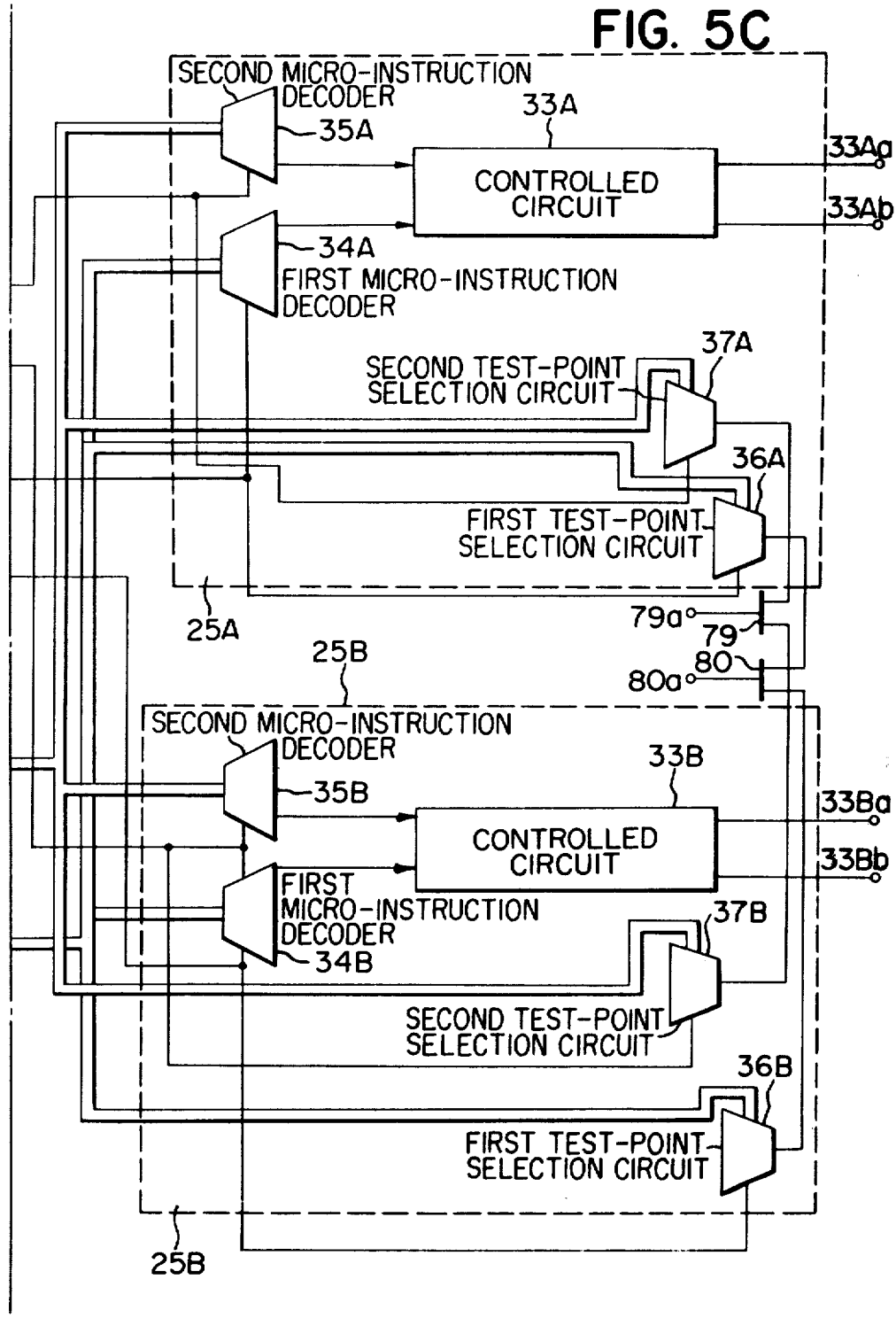

FIG. 6

| NO. | LOGIC SYMBOLS | EXPLANATION |
|---|---|---|
| 1 | 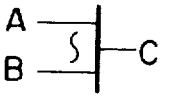 | OR GATE |
| 2 | 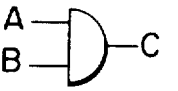 | AND GATE |
| 3 | 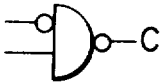 | AND GATE OUTPUT = $\overline{A} + B$ |
| 4 | 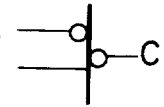 | NOR GATE OUTPUT = $\overline{A+B}$ |
| 5 | 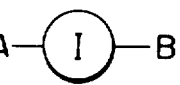 | DELAY FLIP-FLOP DELAYS OUTPUT B BY ONE I PHASE CLOCK CYCLE |
| 6 |  | HOLD FLIP-FLOP IN RESPONSE TO I PHASE CLOCK, C CHANGES TO "I" OR "O" DEPENDING UPON WHETHER A OR B IS "I" AND HOLD "I" OR "O". |
| 7 | 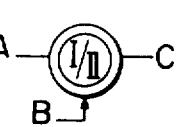 | HOLD FLIP-FLOP WHEN A IS "I", C CHANGES TO "I" IN RESPONSE TO THE I PHASE CLOCK AND HOLD "I", AND WHEN B IS "I", C CHANGES TO "O" IN RESPOSE TO THE PHASE III CLOCK AND HOLDS "O". |

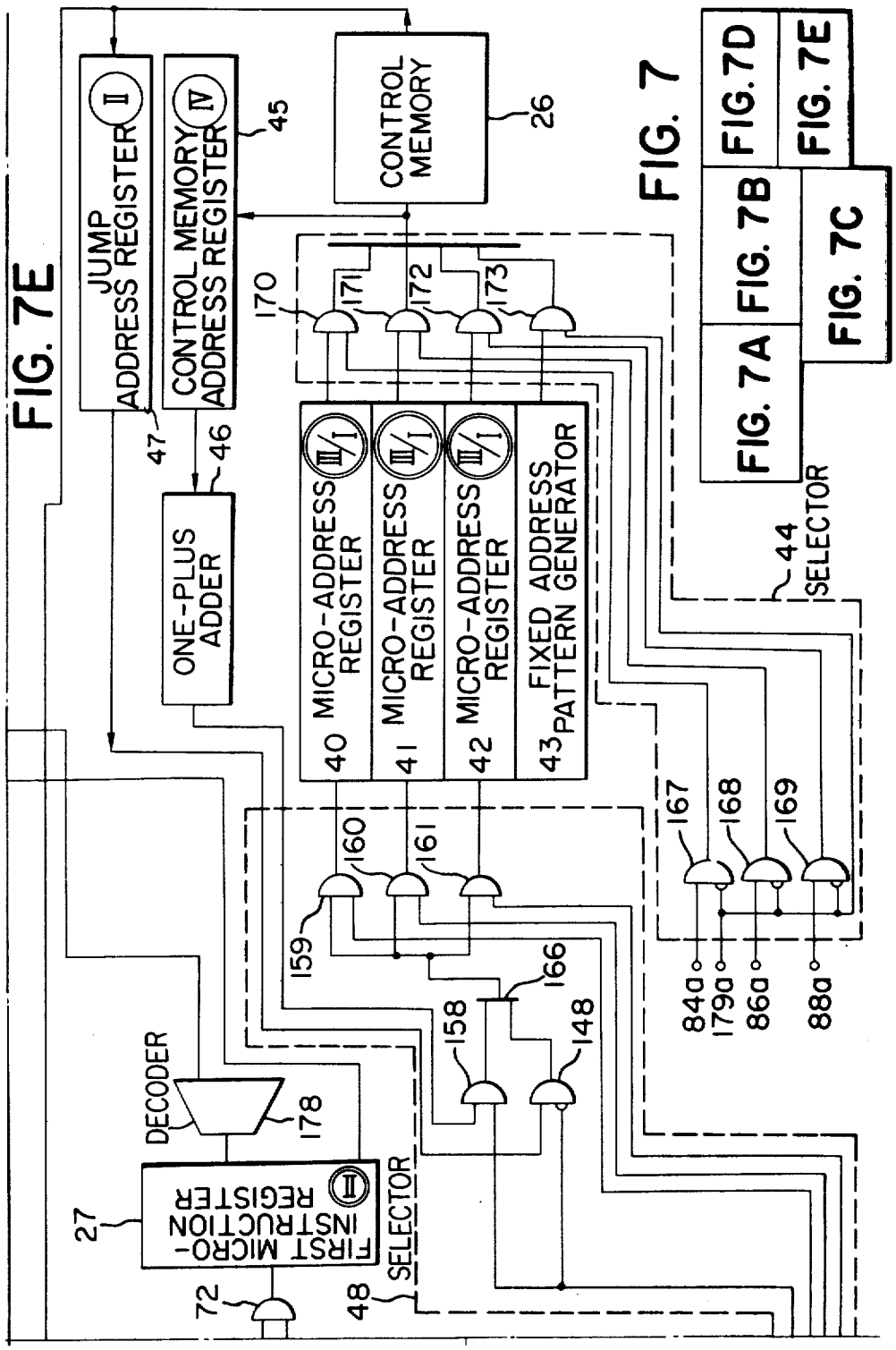

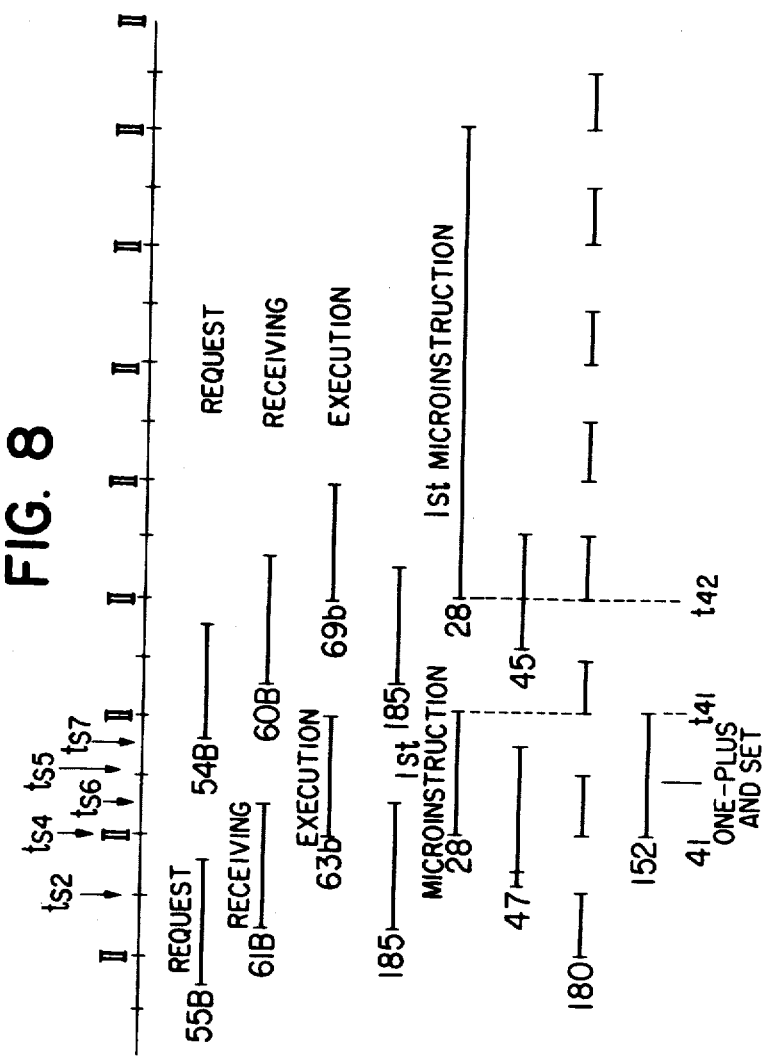

FIG. 10

| BIT POSITION | 0 | 1 |
|---|---|---|
| 0 | ONE-PLUS SIDE ADDRESS 2nd MICROINSTRUCTION | ONE-PLUS SIDE ADDRESS WAIT |
| 1 | ONE-PLUS SIDE ADDRESS 1st MICROINSTRUCTION | ONE-PLUS SIDE ADDRESS EXECUTION REQUEST |

| 2 | 3 | 4 |
|---|---|---|
| JUMP ADDRESS 2nd MICROINSTRUCTION | JUMP ADDRESS WAIT | INTERRUPTIBLE EXECUTION |
| JAMP ADDRESS 1st MICROINSTRUCTION | JUMP ADDRESS EXECUTION REQUEST | UNINTERRUPTED EXECUTION |

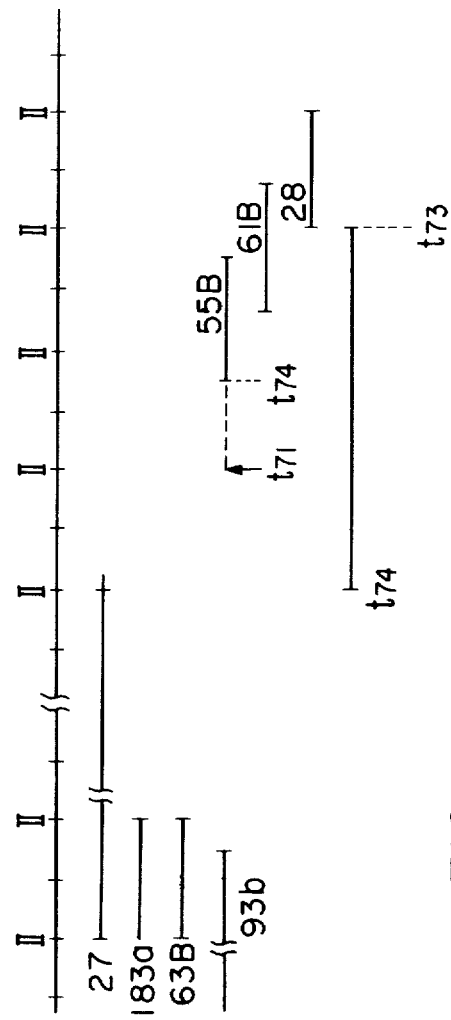
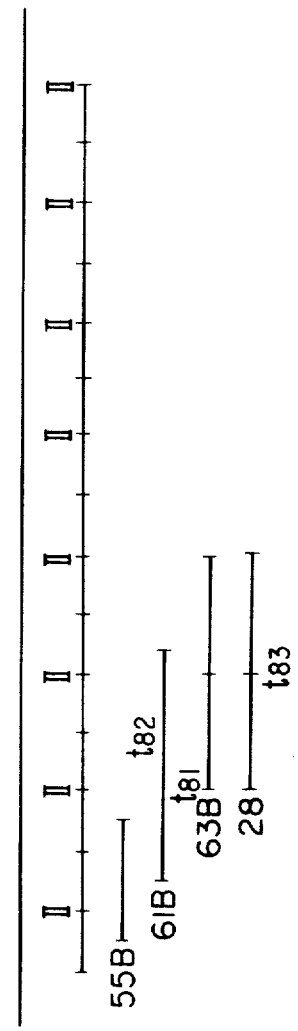
FIG. 13
FIG. 14

MICROPROGRAM CONTROL DEVICE

BACKGROUND OF THE INVENTION

The present invention relates to a microprogram control device for time-division multiplex control of a plurality of controlled devices by one microprogram control circuit.

The prior art data channels for computer systems comprise, in general, (i) a common portion for controlling the interface between a central portion or processing unit and a main memory and (ii) a plurality of individual portions each having an input-output interface control part. In the data channels of such type, the common portion is called a channel multiplexer and the individual is called a subchannel. With data channels of the type described, each subchannel has its own input-output interface control part so that with increase in number of the subchannels the control device becomes large in size. In addition, control circuits are distributed among the channel multiplexer and subchannels so that a large number of control information storage means must be provided for storing the same control information in the channel multiplexer and the subchannel. Furthermore, there arises a complex interface and synchronization problem among the control circuits. Thus with the increase in number of the subchannels the cost increases while the control efficiency decreases.

To solve these problems, there has been devised and demonstrated a time-division multiplex control system wherein the control circuits for the subchannels are centralized in the channel multiplexer. However, if too small a unit or scale of time-division is employed in a time-division multiplex control system based on the prior art wired logic control method, the number of required parts for a switching circuit for the time-division control of the subchannels is increased enormously in number. On the other hand, when a large time-division scale is employed, the result is that subchannels must wait for a long time and the time required for transmitting data to and from the input-output unit exceeds a predetermined desired transfer time.

In the microprogram control system, a processing or operation of one subchannel is halted at the end of one microprogram step so that a switching circuit for the time-division multiplex control of the subchannels may be constructed with a relatively small number of parts. However, in order to activate one of a plurality of controlled circuits connected to each of the subchannels, the channel multiplexer must be provided with microinstruction registers corresponding to each of the subchannels or must be provided with means for obtaining logical products between all of the microinstruction control signals and the number of the designated subchannel. Thus, this system still has a disadvantage that a large number of parts are required.

SUMMARY OF THE INVENTION

In view of the above, one of the objects of the present invention is to provide a microprogram control device with a simplified time-division switching circuit.

Another object of the present invention is to provide a microprogram control device wherein microinstructions specifying different operations or processes may be executed in parallel and efficient manner, whereby the decrease in processing capacity resulting from the prior art serial processing of the microprogram may be avoided.

To the above and other ends, the present invention provides a microprogram control device comprising a plurality of microinstruction registers corresponding to (i) a first type of microinstruction which is executed over a plurality of machine cycles and (ii) a second type microinstruction which is executed during one machine cycle, and a preference circuit for selecting one of said plurality of microinstruction registers at a machine cycle and selecting one of a plurality of controlled devices in response to the contents of said selected microinstruction, and means for executing said first and second type microinstructions in parallel to provide multiplex control of said plurality of controlled devices.

BRIEF DESCRIPTION OF THE DRAWINGS

FIG. 5, representative of FIGS. 5A–5D, is a detailed block diagram thereof;

FIG. 6 shows logic symbols with explanation used in the block diagrams;

FIG. 8 shows a time chart used in the explanation of the mode of operation of the preferred embodiment;

FIG. 9 shows the fields of a microinstruction;

FIG. 10 is a table of instructions stored in the next instruction control field NXT shown in FIG. 9;

FIG. 13 is a time chart corresponding to the flowchart shown in FIG. 12;

FIG. 14 is a time chart of the uninterrupted execution of microinstructions;

The same referenced numerals are used to designate similar parts throughout the figures.

DESCRIPTION OF THE PREFERRED EMBODIMENT

Figure 1:
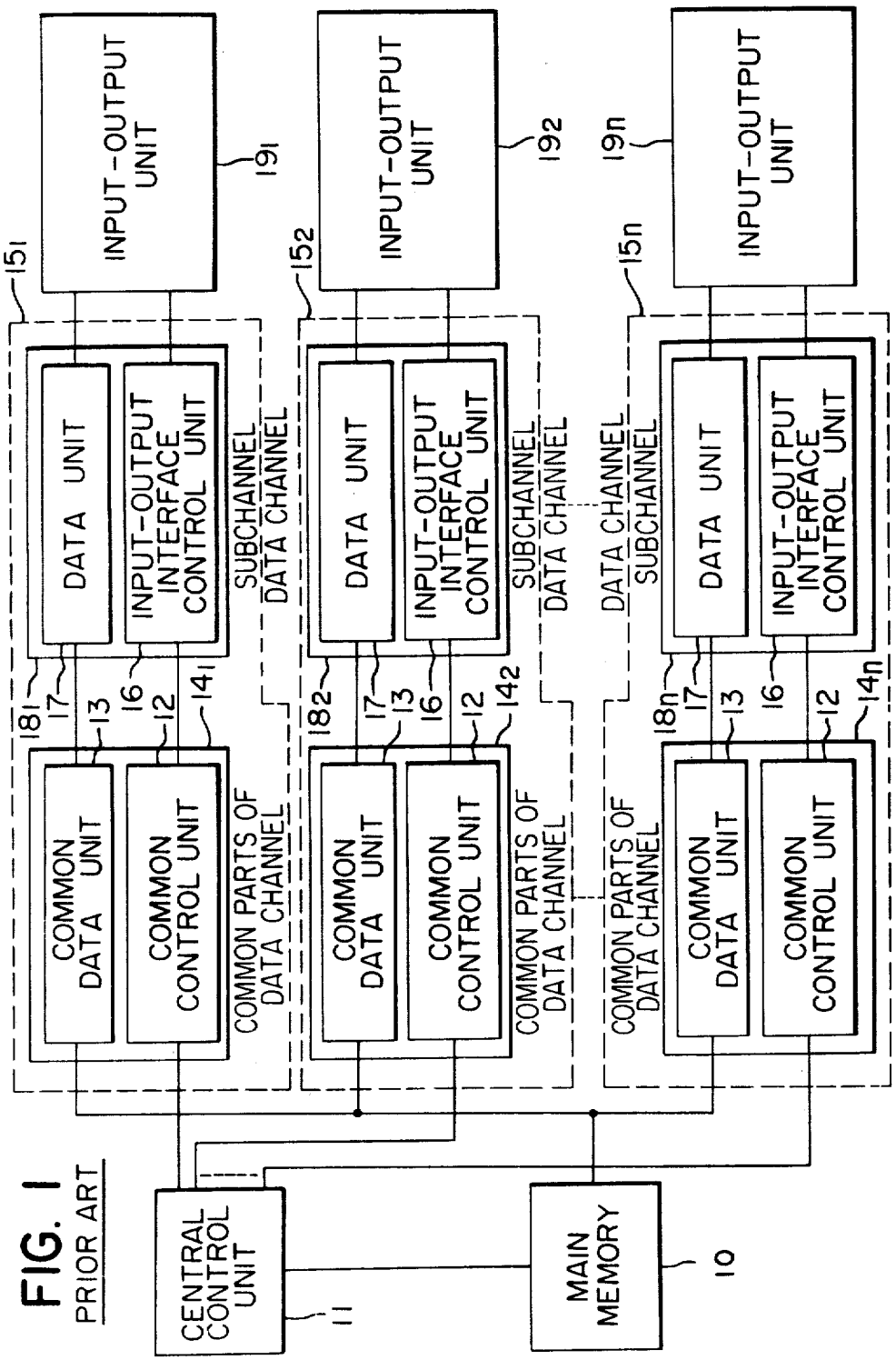
FIG. 1 is a block diagram of a prior art computer system.
Figure 2:
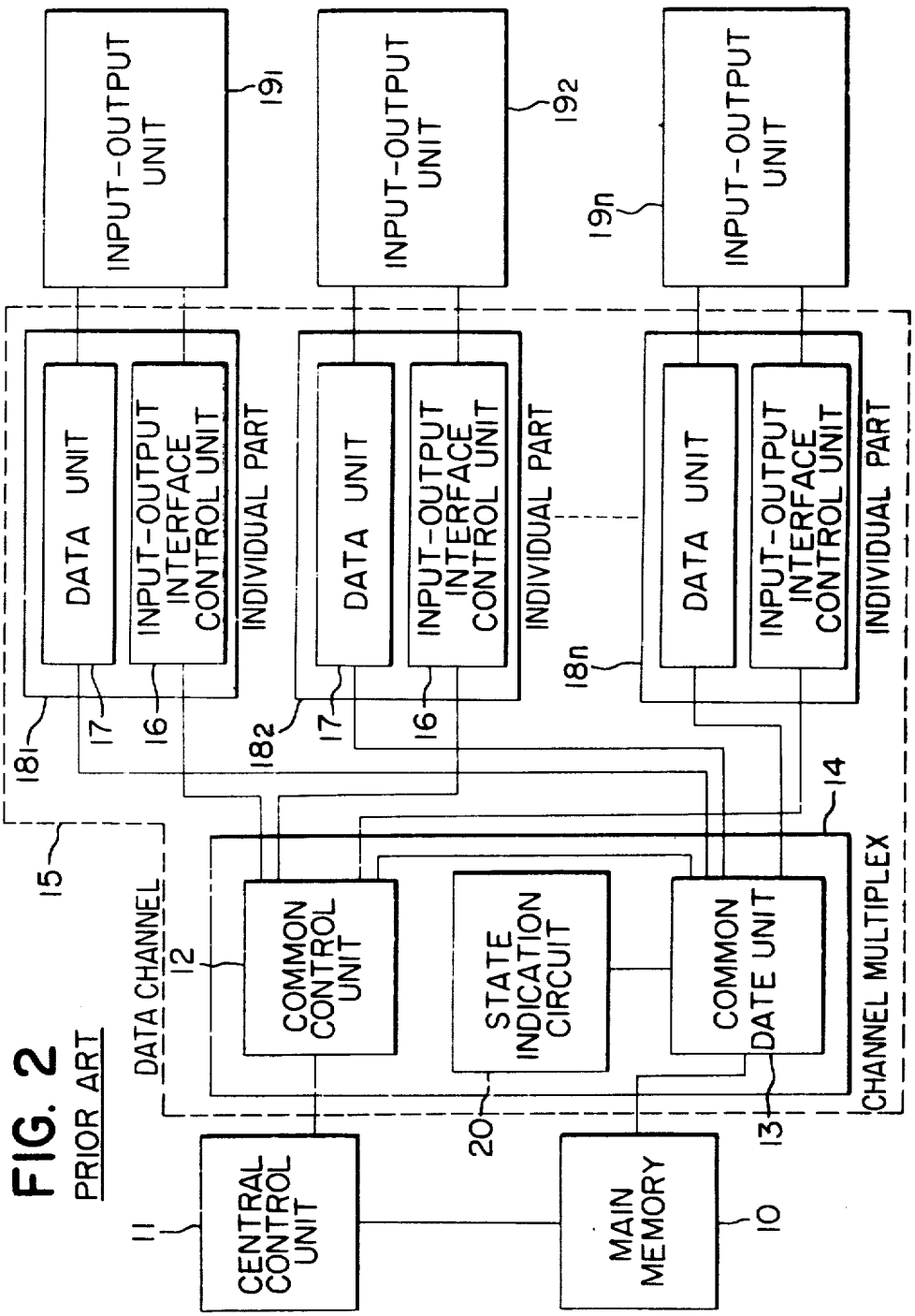
FIG. 2 is a block diagram of an improved prior art computer system.

Prior Art, FIGS. 1 and 2

Prior to the description of the preferred embodiment of the present invention, a prior art computer system will be briefly described with reference to FIG. 1 in order to specifically point out the problems thereof.

The computer system shown in FIG. 1 comprises (A) a main memory 10, (B) a central control unit 11, C a plurality of common data channel parts $14_1$-$14_n$ each consisting of (i) a control unit 12 for controlling the interfaces with the main memory 10 and central control unit 11 and (ii) a data unit 13, (D) a plurality of channel individual parts $18_1$-$18_n$ each consisting of (i) an input-output interface control unit 16 and (ii) a data unit 17 interconnected with the interface control unit 12 and the data unit 13, respectively, and (E) a plurality of input-output units $19_1$-$19_n$ connected to the individual parts $18_1$-$18_n$, respectively. When data channels $15_1$-$15_n$, each consisting of the common part 14 and individual part 18 are multiplexer channel devices, the common parts $14_1$-$14_n$ are called channel multiplexers while the individual parts $18_1$-$18_n$ are called subchannels.

Since the subchannels $18_1$-$18_n$ have respective input-output interface control units 16, the counter system has the disadvantage that the number of parts required increases in proportion to the number of subchannels 18. In addition, since the control units 12 and 16 are distributed in each of the channel multiplexers 14 and the subchannels 18, there must be provided a memory portion for storing the same control instructions or information in each of control units 12 and 16. Furthermore, the interface control between the control units 12 and 16 and the synchronization therebetween becomes more complex. Thus with increase in number of the subchannels 18, the cost increases while the control efficiency drops.

In order to solve the above problems, there has been devised and demonstrated a prior art computer system of the type wherein, as shown in FIG. 2, instead of providing the common control unit 12 and the common data unit 13 in each of a plurality of channel multiplexers 14, a common control unit 12 and a common data unit 13 are incorporated in the channel multiplexer 14 together with a state indication circuit 20 for time-division multiplex control of the subchannels $18_1$-$18_n$.

When too small a unit of time-division is utilized in a time-division multiplex arrangement based on the wired logic control method, the number of required parts of the associated switching circuits for switching the subchannels 18 is increased considerably. On the other hand, when too large a time-division unit is utilized, the waiting time of some subchannels 18 becomes too long because of the long time required for processing a data transfer request from an input-output unit, so that the response time to the data transfer request exceeds a predetermined desired value.

In the case of time-division multiplex control based on a microprogram control system, the microprocessing for each of the subchannels $18_1$-$18_n$ is accomplished within a single microprogram step, so that the number of parts of the switching circuits required for the time-division multiplex control ("multicontrol") of the subchannels $18_1$-$18_n$ may be considerably reduced. However, in order to activate only one specified controlled device corresponding to the subchannels $18_1$-$18_n$, each channel multiplexer 14 must be provided with (i) microinstruction registers corresponding to the subchannels $18_1$-$18_n$ or (ii) logic gates for performing logical AND operations of all of the microinstruction control signals and a number defining the address of the subchannel specified. Thus the control circuit still requires a large number of parts.

Next the underlying principle of the present invention will be described. In the microprogram control circuitry of the channel device 14 are (i) instructions for using an arithmetic operation bus of the common data unit 13, (ii) instructions for setting or resetting a holding type flip-flop in order to control the response of each of the input-output interface control units 16, and (iii) instructions for testing the state of the flip-flops and the conditions of the data units 17 of the subchannels $18_1$-$18_n$. One of the instructions for using the arithmetic operation bus is used in common among the subchannels $18_1$-$18_n$, while another such instruction is used for only one of the subchannels $18_1$-$18_n$. For instance, in case of data transfer between the main memory 10 and one of the subchannels $18_1$ to $18_n$, only one subchannel is permitted to access the main memory unit. Since the memory access time is longer than an instruction execution period, the corresponding microinstruction is executed in several steps.

Figure 3:
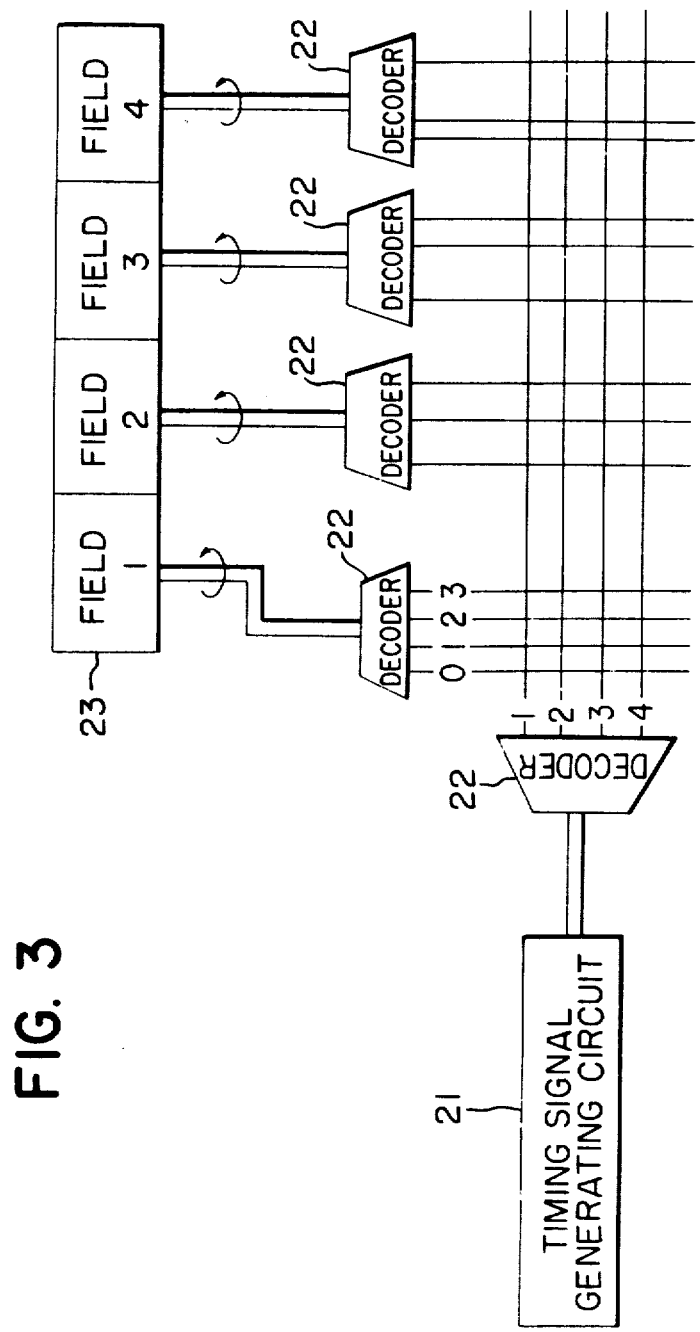
FIG. 3 is a block diagram of a control points designation circuit.

However, during the execution of the microprogram, the mode of waiting for an answer from the main memory 10 requires a relatively small number of control operations, so that such operations, requiring a few machine cycles, may be specified by only one microinstruction. Where a large number of controlled points is involved, the time sequential control of a plurality of controlled points may be specified by the combination of a timing signal generating circuit 21, a decoder 22 and a sequential control field 23 shown in FIG. 3 so that effects similar to those attained by the execution of a plurality of microinstructions may be attained. For instance, in case of executing the steps for four machine cycles corresponding to one microinstruction, a controlled point which is specified by a field 2 in the sequential control field 23 is specified in the second cycle, a controlled point to be specified by the field 3 is specified by the first and third cycles and so on.

In addition to the microinstructions for controlling the controlled points in a few machine cycles, there are microinstructions which may be executed independently of each other for specifying controlled points for setting or resetting the flip-flops. In the preferred embodiment to be described below, a first type microinstruction which is executed in a few machine cycles and a second type microinstruction which is executed in one machine cycle may be executed in parallel.

Preferred Embodiment

Figure 4:
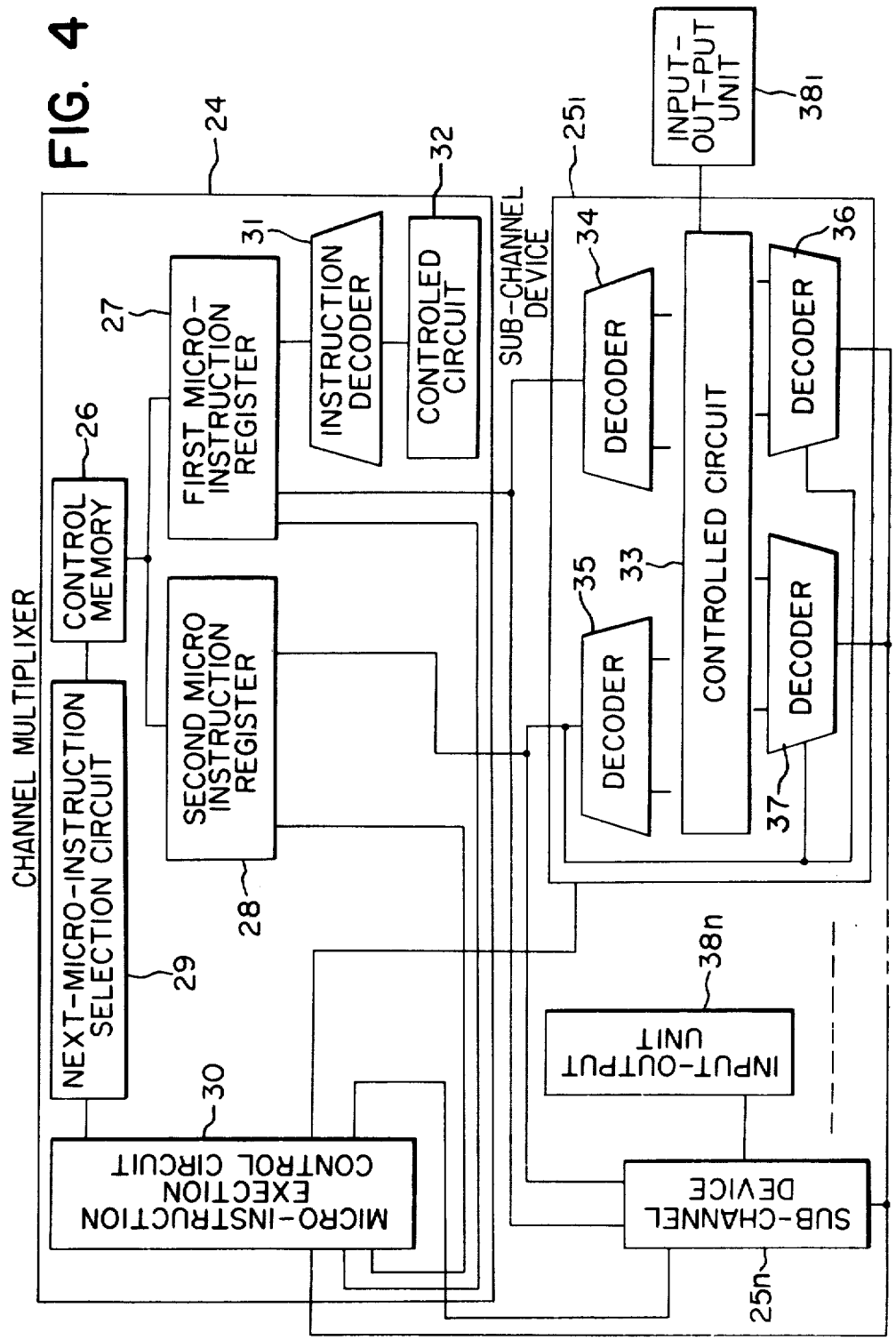
FIG. 4 is a schematic block diagram of a preferred embodiment of the present invention.

In FIG. 4, there is shown in block diagram a preferred embodiment of the present invention, wherein one channel multiplexer 24 is connected to a plurality of subchannels $25_1$-$25_n$, and comprises a control memory 26 storing microprograms, first and second microinstruction registers 27 and 28 for storing first and second type microinstructions, respectively, a next-microinstruction selected circuit 29, a microinstruction execution control circuit 30, a controlled device or circuit 32 such as an arithmetic unit within the channel multiplexer 24 and an instruction decoder 31 for generating control signals to be applied to the controlled circuit 32. Each of the subchannels $25_1$-$25_n$ comprises a controlled section or circuit 33, decoders 34 and 35 for delivering control signals to the controlled circuit 33, and test circuits 36 and 37 for testing the controlled circuit 33 in response to the first and second type microinstructions. The subchannels $25_1$-$25_n$ are connected through the input-output interface to input-output units $38_1$-$38_n$ respectively.

Next referring to FIG. 5, the construction and mode of operation of the microprogram control device in accordance with the present invention will be described in more detail. For the sake of simplicity, the control system consisting of one channel multiplexer 24 and two subchannels 25A and 25B will be described. The next-microinstruction selection circuit 29 comprises a microaddress register 40 for controlling the 1 linterface with the central control unit 11 in response to the input-output instruction therefore, microaddress registers 41 and 42 for controlling the subchannels 25A and 25B, respectively, a fixed address pattern generator 43, a selector 44 for selecting one of the microaddress registers 40, 41 and 42 and the fixed address pattern generator 43, a control memory address register 45 for storing a selected address, a one-plus adder 46 for stepping the address, a jump address register 47 for storing an address specified by a microinstruction, and a selector 48 for selecting the output either from the one-plus adder 46 or jump address register 47. The output of the selector 48 may be stored into one of the microaddress registers 40, 41 and 42. For the sake of simplicity, the subchannel device 25₁ alone is shown in FIG. 4. However, in FIG. 5, both of the subchannel devices 25A and 25B are shown for more effective explanation. Therefore, elements 25₁, 33, 34, 35, 36 and 37 of FIG. 4 correspond to 25A, 33A, 34A, 35A, 36A and 37A of FIG. 5 respectively.

The read-out outputs of the control memory 26 storing the microinstruction are applied to each of the microinstruction registers 27 and 28 by the output of the selector 44 of the next-microinstruction selection circuit 29. The outputs from the registers 27 and 28 are transmitted to the subchannels 25A and 25B through common buses 49 and 50.

Each of the subchannels 25A and 25B comprises a first microinstruction decoder 34A or 34B, a second microinstruction decoder 35A or 35B, a first test-point selection circuit 36A or 36B responsive to the first microinstruction, a second test-point selection circuit 37A or 37B responsive to the second microinstruction and a controlled circuit or data structure 33A or 33B.

A request decision circuit 51 makes the decision of the next microinstruction type to be executed following the microinstruction which is being executed in response to the first or second type microinstruction and identifies whether there is an instruction execution request or not and registers one request to either of first and second microinstruction-execution request circuits 52 and 53 in the microinstruction execution control circuit 30 corresponding to the first and second type microinstructions, respectively.

The microinstruction-execution control circuit 30 further includes hold type flip-flops 54A–54C corresponding to the central control unit and the first and second subchannels 25A and 25B, respectively, and for requesting the execution of the first microinstruction, hold type flip-flops 55A–55C corresponding to the central control unit 11 and the first and second subchannels 25A and 25B, respectively, and for requesting the execution of the second microinstruction, first and a second microinstruction request selection circuits 56 and 57; an instruction-type selection circuit 58 for specifying the selection circuit 56 or 57 to be activated, a time-slot allocation circuit 59 for dynamic selection of the first microinstruction request, delay type flip-flops 60A–60C corresponding to the central control unit 11 and the subchannels 25A and 25B, respectively, for receiving the first microinstruction request and delay type flip-flops 61A–61C corresponding to the central control unit 11 and the first and second subchannels 25A and 25B, respectively, for receiving the second microinstruction request.

Only one of these flip-flops 60A–60C and 61A–61C is set and indicates that the request has been received. The output of one of the registers 40–42 or the fixed address pattern generator 43 is transmitted through the selector 44 in the next microinstruction selection circuit 29 to the control memory 26. Thus, the microinstruction is read out.

The control circuit 30 further includes a delay type flip-flops 64A, 64B and 64C corresponding to the central control unit 11 and the first and second subchannels 25A and 25B and also being reset by the output of a gate 198 (see FIG. 7), respectively, and for identifying the execution of the first type microinstruction, flip-flops 63A, 63B and 63C corresponding to the central control unit 11 and the first and second subchannels 25A and 25B, respectively, and for indicating the execution of the second type microinstruction, microinstruction-request flip-flops 62A, 62B and 62C corresponding to the central control unit 11 and the first and second subchannels 25A and 25B, an input-output instruction from the central control unit 11, a decoder for discriminating the number or address of the subchannel 25A or 25B, AND gates 67–72, OR gates 73–80, a decoder 81, signal lines 82a and 82b for transmitting the signal for specifying the subchannel 25A or 25B in response to the first type microinstruction and signal lines 83a and 83b for transmitting the signal for specifying the subchannel 25A or 25B in response to the second microinstruction.

The logic symbols used in FIG. 5 are explained in FIG. 6.

In FIG. 7 there are shown in great detail the next-instruction selection circuit 29 and the microinstruction-execution control circuit 30.

The second type microinstruction-execution-request register circuit 53 of the control circuit 30 includes OR gates 84–89, AND gates 90–92, hold flip-flops 93A–93C, AND gates 94–101 and OR gates 102–104. The first microinstruction-execution-request register circuit 52 includes AND gates 105–109 and OR gates 110 and 111. The second microinstruction-request selection circuit 57 includes AND gates 112–122 and OR gates 123–125, whereas the first microinstruction-request selection circuit 56, AND gates 126–137, OR gates 138–140 and OR gates 196 and 197. The instruction-type selection circuit 58 includes a gate 141 and OR gates 142–144.

The selector 48 of the next microinstruction-selection circuit 29 includes NAND gates 145–147, AND gates 148–161 and OR gates 162–166, whereas the selector 44, AND gates 167–173 and an OR gate 186. The request decision circuit 51 includes a NOT gate 174 and OR gates 183–185, a decoder 175 used when the jumping condition is met and a second decoder 176 used when the jumping condition is not met.

The instruction-sequence control circuit 177 is connected through a decoder 178 to the first microinstruction register 27. Further associated circuits are a fixed address control circuit 179, a flip-flop 180 and OR gates 181 and 182 connected as shown (See FIG. 7D)

Next with further reference to FIG. 8, one fundamental step of the microprogram control system of the present invention will be described. It is assumed that the control device be operated in response to four types of clocks (i.e. phase I, II, III and IV) in one machine cycle, but it should be noted that the present invention is not limited to this operation. First the control of the first subchannel 25A by the channel multiplexer 24 in response to the second type microinstruction will be described. The microinstruction execution request flip-flop 55B corresponding to the subchannel 25A in the microinstruction-execution control circuit 30 is set. The preference operation is carried out in the manner to be described below when a plurality of microinstruction-execution request flip-flops 54A–54C and 55A–55C are set.

When the requests for execution of the first and second microinstruction occur simultaneously with the flip-flops 54A–54C and 55A–55C being set, the gate 141 in the instruction type selection circuit 58 (See FIG. 7) is turned into the logical state "1" in response to the output 144A from the first microinstruction-request selection circuit 56 so that the second type microinstruction-execution request is blocked at the gates 112–114. However even when there occurs the first type microinstruction execution request and when the output 177a from the instruction sequence control circuit 177 is the logical state "1"; that is, an instruction is being executed over a plurality of machine cycles, the first type microinstruction-execution request is blocked at the gates 129–131 through the OR gate 143, but the second microinstruction execution request is received through the gates 112, 113 and 114 because the gate 141 is turned into the logical state "1". It should be noted that the logical state "0" appears at the output 177a of the instruction-sequence control circuit 177 at the last cycle of the second type microinstruction, because the first type microinstruction can be executed in the machine cycle following the last machine cycle of the second type instruction. The execution of the first type microinstruction is preferred over the execution of the second type microinstruction.

Now the preference operation in the second microinstruction-execution-request selection circuit 57 will be described. When OR gate 123 is in the logical state "1", the gates 118 and 119 are also in the logical state "0", and when OR gate 124 is in the logical state "1", the gate 119 is also in the logical state "0". As a result, the preference or priority to the second microinstruction execution requests is in the order to 61A, 61B and 61C. In like manner, the preference of the first type microinstruction execution requests is made, but is dynamically changed as will be described later in conjunction with the time-slot allocation circuit 59. Thus, within one machine cycle, only one request is received.

After each of the first and second type microinstruction request flip-flops 60A–60C and 61A–61C is selected, the execution of the microinstruction is similar to a state that only one of the first and second type microinstruction execution request flip-flops 54A–54C and 55A–55C is set. Therefore, in the following description it is assumed that only one of the flip-flops 54A–54C and 55A–55C be set.

In order to simplify the description of our invention, it is assumed that all flip-flops 54A–54C, 55A and 55C except the flip-flop 55B are reset. That is, the outputs of the gates 113, 116, 118 and 124 are logical state "1s" and in response to the III phase clock pulse, the output 61b of the flip-flop 61B becomes the logical state "1", so that the output from the gate 86 in the microinstruction-execution-request register circuit 53 becomes the logical state "1". In response to the fourth or IV phase clock, the flip-flop 93B for inhibiting the request from the exterior is set. Thereafter, the microprogram starting request from the first subchannel 25A is prohibited by the gate 95. The release of the prohibition of requesting the microprogram is made in accordance with the instruction of the microprogram. When there is no request for generating a fixed address from the fixed address control circuit 179, the output 179a becomes the logical state "0". Thus, since the request-receiving flip-flop 61B is in the logical state "1", the output from the gate 168 in the selector 44 becomes the logical state "1" through the OR gate 86, and the contents in the microaddress register 41 for subchannel 25A are transferred through the gate 171 into the control memory 26 and a microinstruction is read out from the control memory 26. Since the microinstruction-request-receiving flip-flop 61B is in the logical state "1", the output of the gate 77 is the logical state "1", and a microinstruction is set through the gate 71 into the second microinstruction register 28.

The field formation of the second microinstruction register 28 is shown in FIG. 9. Data in the fields C1, C2 and C3 are transferred to the decoder 81 in channel multiplexer, the decoders 35A and 35B and the test-point selection circuits 37A and 37B in the first and second subchannels 25A and 25B. However, the microinstruction-execution indicating flip-flop 63B is driven into the logical state "1" at the same timing with $t_{54}$ (See FIG. 8) at which the microinstruction is loaded into the second microinstruction register 28, and the output from the flip-flop 63B is transmitted through the subchannel specifying signal line 83a to the decoder 35A and the test-point selection circuit 37A in the first subchannel 25A to activate them. As a result, the contents in the second microinstruction register 28 are interpreted and executed only by the decoder 81 in the channel multiplexer, the decoder 35A and the test-point selection circuit 37A in the first subchannel 25A.

Meanwhile in response to the IV phase timing pulse $t_{53}$ (See FIG. 8), the control memory address register 45 in the next-microinstruction selection circuit 29 is renewed and its output is transmitted through the one-plus adder 46 to AND gate 158 in the selector 48. The output from the flip-flop 180 is the logical state "1" during the II to IV phase clocks, and AND gate 158 and OR gate 166 in the selector 48 hold the output from the one-plus adder 46 during the II to IV phase clocks. The output 81a "0" of the decoder 81 connected to the second microinstruction register 28 is applied to the gate 146 of the selector 48 in this case, so that the output from AND gate 152 is the logical state "1", and in response to the III phase timing clock $t_{56}$, an address incremented by one (+1) is loaded into the microaddress register 41 for the subchannel 25A in the next-microinstruction selection circuit 29.

In case the microinstruction in the second microinstruction register 28 is a branch instruction, the output or test result from the test-point selection circuit 37A in the subchannel 25A is transmitted through OR gate 79 to the request decision circuit 51 in the channel multiplexer 24. When the test is successful, the output 181a of OR gate 181 is the logical state "1" so that the outputs from AND gate 149 and OR gate 162 in the selector 48 becomes logical state "1s" at the I phase timing clock $t_{57}$. Since the outputs of AND gate 152 and OR gate 164 are the logical state "1s", the output of AND gate 154 is the logical state "1".

During the IV to II phase clocks, the output of the flip-flop 180 connected to the selector 48 is the logical state "0", and during the same period gates 148 and 166 of the selector 48 hold the output of the jump address register 47 of the next microinstruction selection circuit 29. AND gate 160 of the selector 48 are opened at the I phase timing clock $t_{57}$ and the content $N_1$ of the jumping address register 45 (which are contained in the data in the field JA in FIG. 9) is loaded into the register 41.

If the test is unsuccessful, the output of AND gate 149 in the selector 48 is the logical state "0" so that the content in the jump address register 47 is not transferred into the microaddress register 41 for the first subchannel 25A. After all, the second type microinstruction is executed from the II phase timing clock $t_{54}$ (See FIG. 8) and an address incremented by one is loaded in the microaddress register 41 for the first subchannel 25A in response to the III phase timing clock $t_{56}$, but if the test is successful, the jump address in response to the I phase timing clock $t_{57}$ is loaded in the microaddress register 41.

The control sequence in response to the data in the field NXT shown in FIG. 9 will be described as follows.

As shown in FIG. 10, the next-microinstruction control field NXT includes information concerning a microinstruction to be executed next. That is, the information in 0 bit and 2 bit positions specify the first or second microinstruction register 27 or 28 which is used for the execution of the next microinstruction. The information or instructions stored in the 1 and 3 bit positions specify whether or not the next microinstruction execution request is issued or whether or not the channel multiplexer 24 detects the execution request signal from the central control unit 11, or whether or not the next step is halted until the microinstruction execution request is issued in response to the change of the signal from the input-output interface detected by the subchannel. For instance, assuming that the bits in the NXT field of the microinstruction with an address number $N_0$ be "0 1 1 1 0" as shown in the flowchart in FIG. 12, the request of next instruction given in FIG. 10 is the second type microinstruction of address ($N_0+1$) specified in the one-plus adder 46 and a first microinstruction of an address $N_1$ specified in the jump address register 47. When the test conducted in response to the second type microinstruction with the address $N_0$ is successful, the output 185a of the decoder 175 in the request decision circuit 51 is the logical state "1", and during the execution of this microinstruction $N_0$, the output of the gate 87 in the microinstruction-execution-request register circuit 53 is the logical state "1" so that the output of the gates 106 and 110 in the circuit 52 are the logical state "1s". As a result, the first microinstruction-execution-request flip-flop 54B is set in response to the I phase clock. Thereafter the first type microinstruction request selection method is similar to the second microinstruction request selection method, but in order to dynamically change the preference to the request selection, when the subchannel 25A or 25B specified by the time-slot allocation circuit 59 has the first microinstruction request, the output signal on a signal line 59a of the time-slot allocation circuit 59 becomes the logical state "1" so that the normal selection route is inhibited. Consequently, the outputs 59b and 59c of the time-slot allocation circuit 59 become the logical state "1s" so that the request of the subchannel specified may be forced to be received. When the request is selected, the request-receiving flip-flop 60B is driven into the logical state "1" and the contents in the microaddress register 41 for the first subchannel 25A are transferred through the gates 171 and 186 of the selector 44 to the control memory 26. Since the output from the gate 78 is the logical state "1", the microinstruction read out from the control memory 26 is transferred into the first microinstruction register 27 through the gate 72. Thus, the control of memory access, for instance, is carried out over a plurality of machine cycles (one machine cycle is defined to continue from one II phase clock to the succeeding II phase clock).

Next referring to FIG. 11, the preference operation by the time-slot allocation circuit 59 will be described in more detail. The circuit 59 includes AND gates 187, 188 and 189. OR gates 190, 191 and 192, an n bit cyclic counter 193, a decoder 194 for decoding the output from the counter 193, a decoder 194 for decoding the output from the counter 193 and a short circuit 195 for interconnecting the output terminals of the decoder 194 and the input terminals of the OR gates 190 and 191. The interconnections between the input and output terminals of the short-circuit 195 may be varied as needs demand, but the one-to-one correspondence or connection must be held between them so that in response to arbitarily selected contents of the counter 193 either of OR gate 191 or 190 delivers the logical state "1" output, in response to which either of AND gate 188 or 189 delivers the logical state "1" output. Therefore, when the output of either of the gate 130 or 131 in the first microinstruction-execution-request selection circuit 56 is the logical state "1", and either of AND gate 188 or 189 is opened, the output 59a of the time-slot allocation circuit 59 becomes the logical state "1". Therefore, the time-slot allocation circuit 59 is preferred to the simple preference circuits 132, 133 and 134 in the first microinstruction-execution-request selection circuit 56. The n bit cyclic counter 193 is stepped by the II phase clock in response to every logical state "1" output from OR gate 78 at every time when the first microinstruction is executed.

The jumpers in the short-circuit 195 may be so arranged as to meet the frequency of occurrences of the first type microinstructions corresponding to each subchannel so that the requests of the subchannels may be selected depending upon their demand frequencies.

Figure 12:
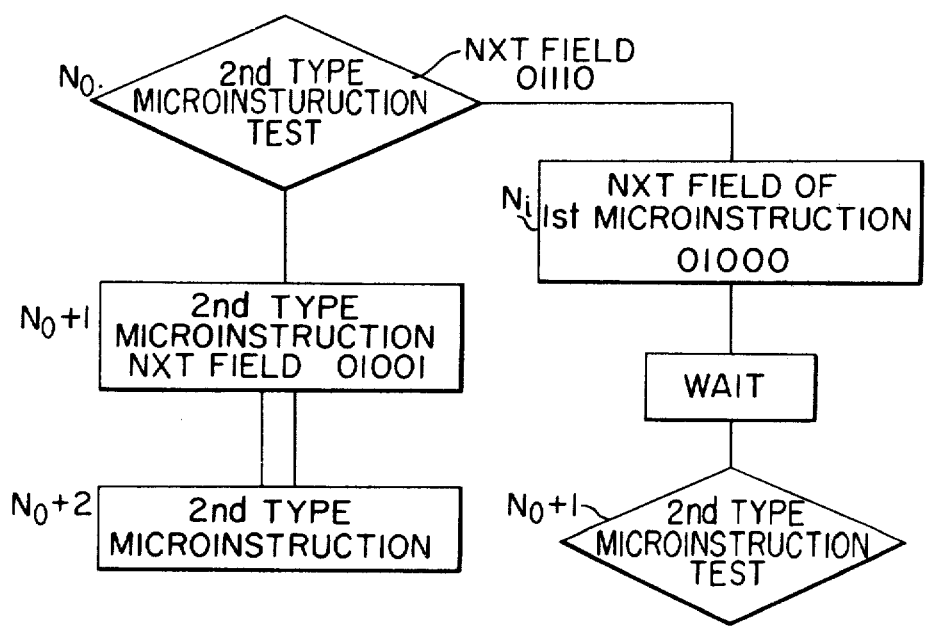
FIG. 12 is a flowchart showing the sequence of executions of microinstructions.

Next referring back to FIGS. 12 and 13, the control sequence will be described when the NXT field contains an instruction for halting the next microstep. As shown in FIG. 12 the instruction at the address $N_1$ specifies the halt of the execution of the next microstep until the first subchannel 25A delivers a microinstruction-execution-request. When the microinstruction at the address $N_1$ is loaded into the first microinstruction register 27, the output 183a from the decoder 176 in the request decision circuit 51 becomes the logical state "1", and the first microinstruction-request register flip-flop 62B is driven into the logical state "1" in response to the II phase timing clock (at which the microinstruction is executed) and remains in the logical state "1" for one machine cycle so that the output from AND gate 91 in the microinstruction-execution-request register circuit 53 becomes the logical state "1", and in response to the I' phase clock (delayed a little time from the I phase clock) the external starting prohibiting flip-flop 93B is driven into the logical state "0". Thereafter the microinstruction starting request from the external of the channel multiplexer 24 may be received through the gate 95 in the second microinstruction-execution-request register circuit 53 or the gate 108 in the first microinstruction-execution-request register circuit 52. After the microinstruction $N_1$ in the first microinstruction register 27 has been executed, the control device is driven into the halt state with the address $N_1 + 1$ stored into the address register 41 for the subchannel 25A.

As described above, during the time when the microprogram issues the next step execution request, the corresponding external-starting-prohibiting flip-flops 93A - 93C remain in the set state. Therefore even when the microprogram starting factors occur simultaneously from the external subchannels 25A and 25B and/or central control unit 11, they may be suppressed until the microprogram is halted so that the microprogram execution control may not be adversely affected at all.

Next referring particularly to FIG. 13, when the second microprogram starting request occurs at time $t_{71}$ from the controlled circuit 33A in the subchannel 25A, the output from the gate 95 in the second microinstruction-execution-request register circuit 53 becomes the logical state "1", and in response to the I phase clock at a time $t_{74}$ the microinstruction-execution-request flip-flop 55b is set, and consequently, the request is selected by the preference circuit 57 so that the request receiving flip-flop 61B is set in response to the III phase clock. In response to the II phase clock at a time $t_{73}$, a microinstruction is loaded into the second microinstruction register 28, and the execution of the microprogram is started again.

As described above, the execution of the microinstruction is halted from the time $t_{72}$ to $t_{73}$ as shown in FIG. 13 without the execution of a loop test microinstruction, and after the time $t_{73}$, whether the desired conditions are met or not is detected in response to the test microinstruction. Therefore a time interval from the time $t_{72}$ to $t_{73}$ may be allocated for the first and second microinstruction registers 27 and 28 in order to control the subchannel 25B or the interfaces with the central control unit 11. Thus the processing capacity of the data channel may be remarkably improved.

Furthermore, as shown in FIG. 8 there exists at least one-machine-cycle idle time (from $t_{41}$ to $t_{42}$) from the completion of one microinstruction to the start of the next microinstruction. But when the microinstructions which must be processed at a higher speed continuously succeed, the logical state "1" is assigned in the 4th bit position for specifying the continuous or interrupted execution in the field NXT shown in FIG. 9, so that microinstruction may be executed continuously for the same subchannel or central control unit. For instance, the time chart when the bit "1" for specifying the continuous or uninterrupted execution is assigned by the instruction at the address $N_0 + 1$ is shown in FIG. 14.

Referring to FIG. 14, when the subchannel 25A is executing the second type microinstruction at the address $N_0 + 1$, the output 176b from the decoder 176 in the request decision circuit 51 becomes the logical state "1" so that the outputs from the gate 142 and OR gate 143 in the instruction type selection circuit 58 are the logical state "1s". As a result the AND gates 112 - 114 and 129 - 131 suppress all the outputs of the microinstruction-execution request flip-flops 55A - 55C and 54A - 54C. At the time $t_{81}$ the subchannel 25A starts to be controlled so that the output from the second type microinstruction-execution indication flip-flop 63B is the logical state "1". As a result, the outputs from the gates 121 and 124 in the second type microinstruction-execution-request selection circuit 57 are the logical state "1s" whereas the output from the gate 123 is the logical state "0". As a consequence the output from the gate 118 is the logical state "1" so that the second microinstruction-execution-request receiving flip-flop keeps in the logical state "1" at the III phase clock of the time $t_{82}$. Simultaneously, the content in the microaddress register 41 for the subchannel 25A changes to $N_1 + 2$, the access to the instruction at this address in the control memory 26 is started and at the time $t_{83}$ a microinstruction is loaded into the second microinstruction register 28. Thus one subchannel may continuously and exclusively use the microinstruction register without the interruption by the microinstruction-execution-request originated from other subchannels or the central control unit 11.

Next the parallel execution of microinstructions will be described with reference to FIGS. 5, 7, 15 and 16. Assumed that the second microinstruction request flip-flop 55B for the subchannel 25A and the first microinstruction request flip-flop 54C for the second subchannel 25B are simultaneously set at the time $t_{91}$, whereas the remaining flip-flops are reset. Since the continuous execution of the first type microinstruction is not specified, the output 176c of the decoder 176 in the request decision circuit 51 is the logical state "0" so that the outputs from the gates 128 and 140 in the first microinstruction-execution-request selection circuit 56 are the logical state "1s". When the first microinstruction register 27 is available or stores no data or when the last machine cycle of the first type microinstruction is reached, the output 177a from the instruction-sequence control circuit 177 becomes the logical state "0". The output 176b from the decoder 176 in the request decision circuit 51 is the logical state "0" and the output from OR gate 143 in the instruction-type selection circuit 58 also changes to the logical state "0" so that the outputs from the gate 131 and 134 in the first microinstruction-execution-request selection circuit 56 changes to the logical state "1s". As a result, at the time $t_{92}$ the first microinstruction-execution-request receiving flip-flop 60C is set. Since the output signal 177a from the instruction-sequence control circuit 177 is the logical state "0", even when only one first microinstruction requests, the output 144a from the gate 144 in the instruction-type selection circuit 58 changes to the logical state "1" and consequently the outputs from the gates 141 and 142 changes to the logical state "1s". As a result the second type instruction request selection is not executed and is postponed until the selection of the first type microinstruction is completed.

Figure 15:
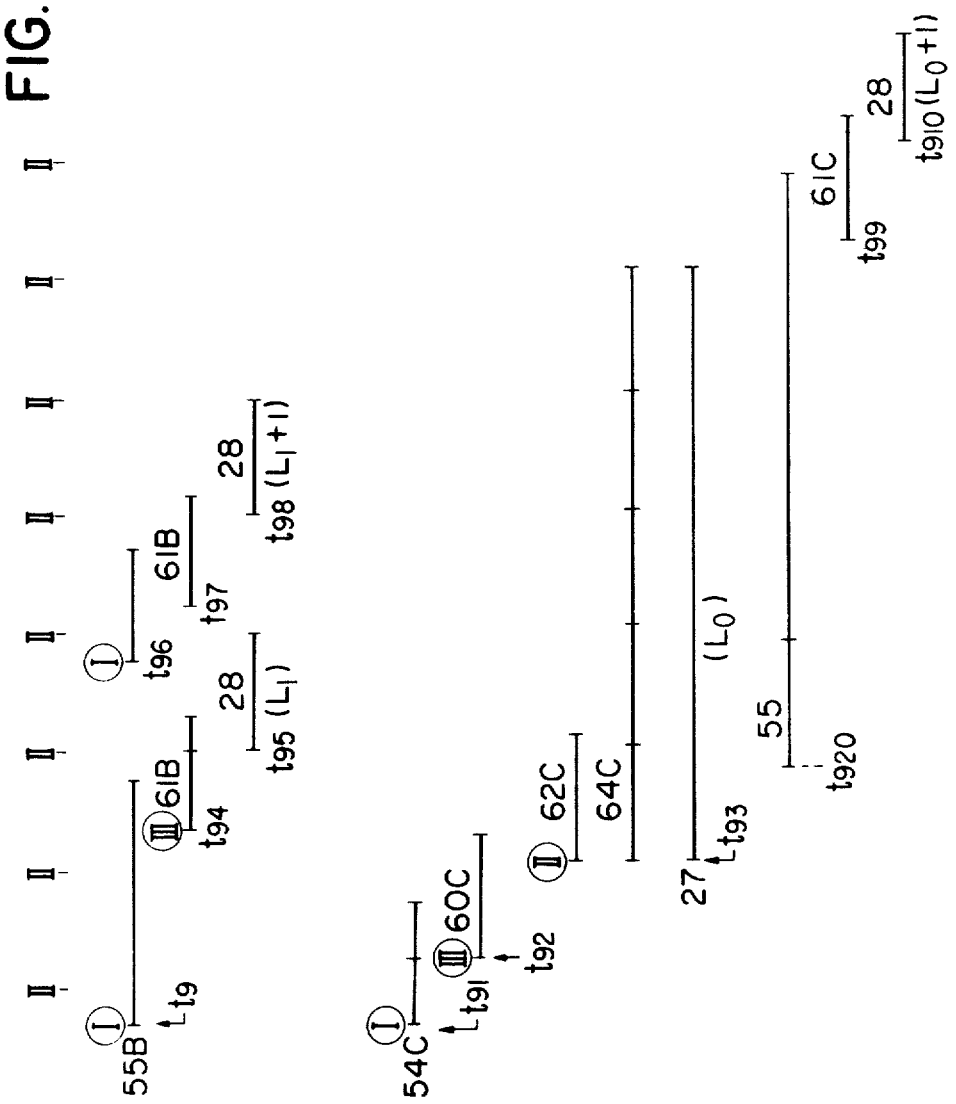
FIG. 15 is a time chart of the parallel execution of microinstructions.
Figure 16:
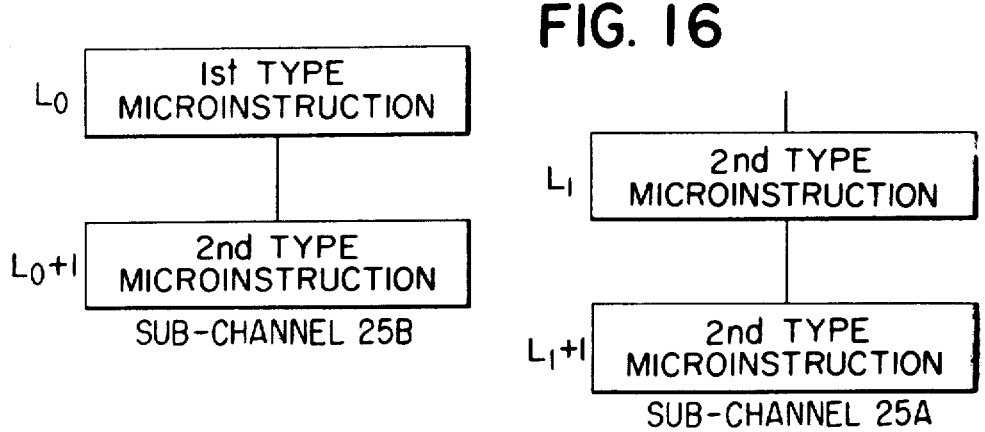
FIG. 16 is a flowchart showing the sequence of the parallel execution of microinstructions.

When the execution of the second type microinstruction is started at a time $t_{93}$ in response to the II phase clock as shown in FIG. 15, the second type microinstruction-execution-request is specified in the NXT field of the microinstruction of address $L_0$ so that in response to the I phase clock at a time $t_{920}$ the output of the gate 101 or 104 is transmitted to the second instruction execution request flip-flop 55 to set it in the microinstruction-execution-request register circuit 53.

Since the request has been received and the first type microinstruction-execution-request flip-flop 54C has been already reset at a time $t_{99}$, the output from the gate 144 in the instruction-type selection circuit 58 changes to the logical state "0" so that the outputs from the gates 141 and 142 changes to the logical state "Os" and the output from the gate 113 in the second microinstruction-execution-request selection circuit 57 changes to the logical state "1". Since the first microinstruction execution indicating flip-flop 64B for the subchannel 25A is in the logical state "0" state, the outputs from the gates 113 and 116 in the second microinstruction-execution-request selection circuit 57 change to the logical state "1s", and the second type microinstruction request from the subchannel 25A is received in response to the III phase clock at the time $T_{94}$ so that the microinstruction at the address $L_1$ is loaded into the second microinstruction register 28 in response to the II phase clock at the time $t_{95}$.

In summary, during the time when the first type microinstruction is being executed over a plurality of machine cycles from the time $t_{93}$, the second type microinstruction for controlling the subchannel 25A or the central control unit 11 is executed in parallel from the time $t_{95}$ so that the processing capacity of the data channel may be considerably improved.

At a time $t_{96}$ the second type microinstruction-execution-request flip-flop 55B has been set and the flip-flop 55C is set, but, the first type microinstruction-execution indicating flip-flop 64C is in the logical state "1", since the first type microinstruction for the subchannel 25B is being executed so that the output from the gate 117 in the second type microinstruction-execution-request selection circuit 57 is the logical state "0". As a result, the second type microinstruction execution request from the subchannel 25B is not received, and the second type microinstruction-execution-request flip-flop 55B for the subchannel 25A has been selected so that the second microinstruction request receiving flip-flop 61B is driven into the logical state "1" state in response to the III phase clock at the time $t_{97}$.

Meanwhile the request of the second type microinstruction-execution-request flip-flop 55C for the subchannel 25B is held until the first type microinstruction has been executed, and at a time $t_{99}$ the second type microinstruction request receiving flip-flop 61C is driven into the logical state "1" in response to the III phase clock so that the request is received. Thus the second type microinstruction in the second microinstruction register 28 is executed from a time $t_{910}$.

In case of the parallel execution, since the contents in the NXT field (See FIG. 9) specifies the type of the next microinstruction, it is previously detected whether the next microinstruction read out from the control memory 26 is loaded into the first or second microinstruction register 27 or 28. Thus, every cycle of the control memory 26 may be effectively utilized without any waste of time and consequently the processing capacity of the data channel may be remarkably improved.

Next the address specification in the microinstruction address registers 40, 41 and 42 will be described. When the channel multiplexer 24 receives the input-output instruction from the central control unit 11 to enable the input-output device, if the subchannels 25A and 25B execute input-output operation, the central control unit 11 must "wait". This is the reason why the address register 40 is provided for monitoring the idling of the subchannels 25A and 25B. When the corresponding subchannel 25A or 25B is available, the top microaddress for the execution of the input-output instruction must be stored into the registers 41 or 42 from the register 40.

For this purpose in this embodiment, an increment address of the address register 40 is stored into the address register 40 for the central control unit 11 while a jump address (for instance, the top microaddress for the execution of the input-output instruction) is stored into the address register for the subchannel 25A or 25B at different timings, respectively, within one machine cycle. As a result, a considerable economical advantage may be obtained.

Figure 17:
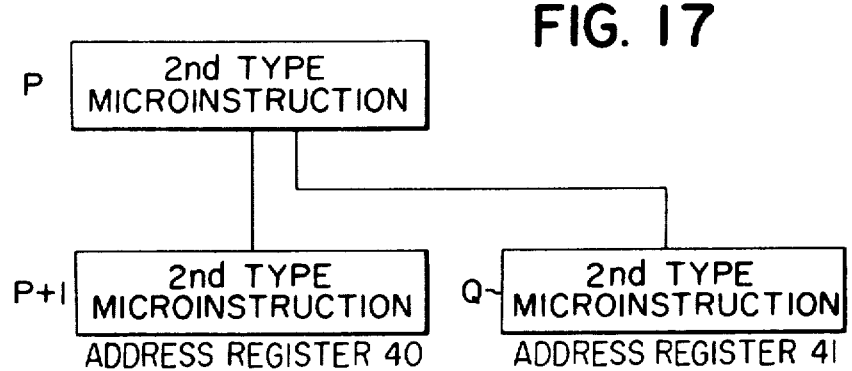
FIG. 17 is a flowchart showing the sequence of address transfer in address registers.

The mode of operation of the present invention will be described with reference to the following instance. For instance, in response to the contet P of the address register 40 for the central control unit 11 (See FIG. 17), the control memory 26 is accessed and a microinstruction is loaded into the second microinstruction register 28. During the execution of the microinstruction at the address P, a jump address Q is stored into the address register 41 for the subchannel 25A specified by the content of the input-output instruction register 65, whereas the address P + 1 is stored into the register 40 for the central control unit 11.

Figure 18:
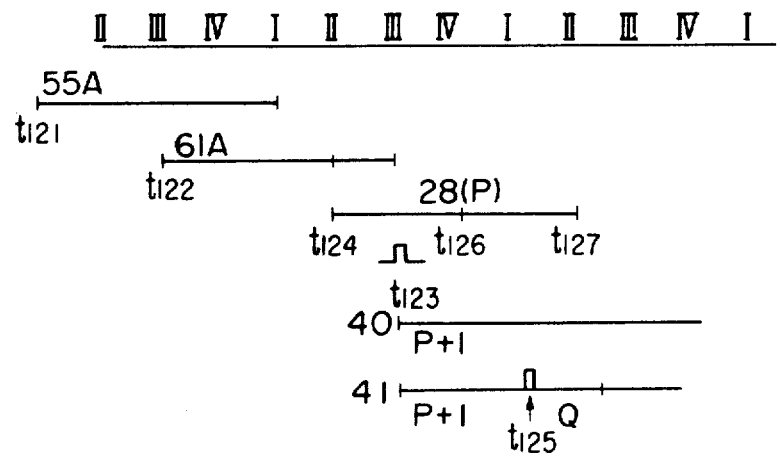
FIG. 18 is a time chart corresponding to the flowchart shown in FIG. 17.

For this purpose, as shown in FIG. 18 at a time $t_{121}$ the flip-flop 55A for requesting the execution of the microinstruction at the address P is set in response to the I phase clock, and the request is received in response to the III phase clock appearing at the time $t_{122}$ so that the microinstruction address register 40 is selected to access the control memory 26. Simultaneously, in response to the III phase clock which appears at the time $t_{123}$, the address P is incremented through the one-plus adder 46 and P + 1 (the output of the one-plus adder 46) is loaded into the register 40. When the execution of the second type microinstruction is started in response to the II phase clock at the time $t_{124}$, the signal on the address switching line 81b of the decoder 81 changes to the logical state "1". The output line 66a of the decoder 66 for specifying the device number of the subchannel 25A specified by the contents in the input-output register 65 changes to the logical state "1" so that the output of the gate 153 of the selector 48 changes to the logical stage "1" and consequently the gates 164, 154 deliver the logical state "1" outputs and the gate 160 is opened. As a consequence, the address P + 1 is temporarily entered into the address register 41 for the subchannel 25A in response to the III phase clock which appears at a time $t_{123}$ through the gate 160. However, in response to the I phase clock which appears at a time $t_{125}$, the outputs from the gates 149 and 162 in the selector 48 change to the logical state "1s" so that the output of the gate 154 changes to the logical state "1" and the gate 158 is closed. While the gate 148 is opened so that the content Q in the jump address register 45 is stored through the gates 148, 160 and 166 into the address register 41 at the time $t_{125}$. Concurrently the second microinstruction-execution-request flip-flop 55B for the subchannel 25A is set in response to the signal transmitted through AND and OR gates 98 and 103 in the microinstruction-execution-request register circuit 53 so that the execution of the microinstruction for controlling the subchannel 25A is started. Though there is the transient address P + 1 in the address register 41 for the subchannel 25A, during th time interval from the time $t_{123}$ to the time $t_{125}$, no adverse effect results because the address P + 1 is not used.

Figure 19:
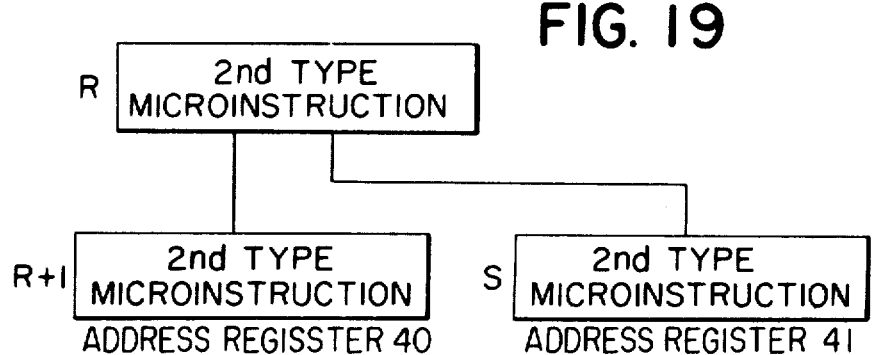
FIG. 19 is a flowchart used for the explanation of the mode of address replacement in an address register in a central control unit.
Figure 20:
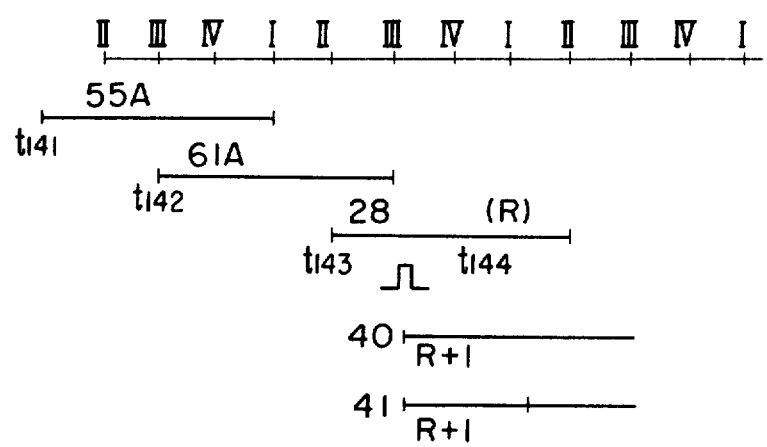
FIG. 20 is a time chart corresponding to the flowchart shown in FIG. 19.

In like manner, in response to the microinstruction for the subchannel 25A the content or address in the address register 40 for the central control unit 11 may be changed as shown in FIGS. 19 and 20.

Figure 21:
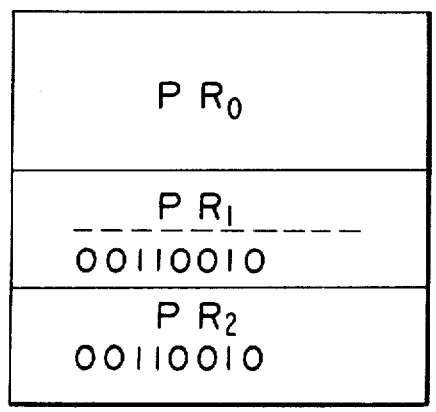
FIG. 21 schematically shows a program for allowing different data channel devices to perform different operations in response to the same microinstruction.

Moreover, according to the present invention, when the outputs of the decoders 34A, 34B, 35A and 35B and the inputs of the test-point selection circuits 36A, 36B, 37A and 37B in the subchannels 25A and 25B are connected to other circuits and the logically same microinstruction is executed in each subchannel, this microinstruction is differently interpreted in each subchannel. Thus, our invention can control different subchannels by one microprogram control device. For instance, when the subchannels 25A and 25B belong to the different subchannels, a microprogram is divided into a common program region PR$_0$ containing a program common to both the subchannels 25A and 25B, and program regions PR$_1$ and PR$_2$ containing respectively programs exclusively for the subchannels 25A and 25B as shown in FIG. 21. Since the programs in the zones PR$_1$ and PR$_2$ are executed exclusively by the subchannels 25A and 25B, respectively, for instance, even when the zones PR$_1$ and PR$_2$ have the same binary coded instruction such as (0 0 1 1 0 0 1 0), the subchannel device 25A interprets it as an instruction for "transmitting a command-out signal" whereas the subchannel device 25B, as an instruction "Clear the input-output buffer".

For instance, assume that the number of the item to be executed or processed exclusively by the subchannel 25A be 23, to be processed by the subchannel 25B be 10 and to be processed by both the subchannels 25A and 25B be 5 and that exclusive instructions needed for processing these items be binary-coded. Then according to the prior art systems the instructions consist of at least 6 bits; that is $23 + 10 + 5 = 38 < 2^6$, but according to the present invention the instructions consisting of only 5 bits ($5 + 23 < 2^5$ and $5 + 10 < 2^4$) may be advantageously used and consequently a minimum number of parts may be used.

In summary, the present invention is very effective when one microprogram control device is used for efficiently controlling a plurality of controlled devices such as input-output control units, communicaton line control units and so on.

As described above, according the present invention, the identification of the type of an instruction specified is possible prior to the access to the control memory so that a microinstruction may be read out depending upon which microinstruction registers are idle and consequently the control memory 26 is accessed more efficiently so that the overall processing capacity of the data channel may be considerably improved. Furthermore when the execution of a microinstruction is not required, no microinstruction-execution-request is transmitted to a controlled device so that an idle time may be advantageously used for the control of other controlled devices and consequently the overall processing capacity of the data channel may be further remarkably improved. In addition, when a microprogram itself starts the next microinstruction, the starting of a microinstruction from the external controlled devices may be suppressed. Therefore even when microinstruction-execution-request receiving and selection circuits are provided for respective types of microinstructions, it is possible to attain the same highly economical microprogram control of a sequence of steps as specified by a microinistruction with the control device being regarded as a simple and single microinstruction starting source causing no adverse effects. Thus the present invention provides an extremely effective data channel.

EXPLANATION OF TERMS

1. Time Division Multicontrol

A multimicroprogram control alternately executing a plurality of microprograms on one step unit at a time or a plurality of step units at another time by time sharing control means. In the present invention, the channel multiplexer exchanges subchannel devices controlled in each microstep and controls a plurality of subchannel devices by time sharing control means.

2. Common Part

A circuit for commonly using a plurality of the same kinds of devices or similar devices. When the common part is used by means of the time sharing control controlling one at a time, the hardware required is reduced. In the present invention, the control memory, microinstruction register, microaddress register, microsequential control portion, etc. in the channel multiplexer of the data channel are common parts.

3. Individual Part

A circuit which cannot be practically used as a common part or economically common use of which is difficult. In the present invention, the microinstruction decoder, microtestinstruction test circuit, data buffer respectively constitute individual circuits and the subchannel comprising these devices constitutes an individual device.

4. Part

An electronic component such as an LSI chip, MSI chip, resistor, capacitor, etc.

5. Common Device

A device comprising a common part (common section) and used as an individual part by means of time sharing control.

6. Subchannels

A plurality of data channel devices are divided into common devices and individual devices, and the common device is referred to as a channel multiplexer and the individual device as a subchannel.

7. Controlled Point

After the control order designated in the field of microinstruction is decoded in the decoder, the control signals are transmitted into controlled circuits (e.g. an operational circuit, input data buffer, etc.) and the opening and closing of gates is caused to occur. The control signals applied to a controlled circuit are referred to as a control point. For example, when access to a main memory is controlled by a high speed microinstruction, waiting time for the answer from the main memory is long, and since the opening and closing signals of the gates are usually continued, the control point is short in comparison with the access time.

8. Controlled Device

Devices not including a basic control portion (e.g. a control memory, microinstruction register, microaddress register, microaddress adder, branch instruction control circuit, etc.) are referred to controlled devices. The controlled device in the present invention essentially comprises a decoder for decoding microinstructions and a test circuit for executing the test (a decision of true or false, a comparison of an exclusive or, etc.) designated by a microinstruction and a circuit acted upon by control signals of microinistructions. In the present invention, the channel mulitplexer corresponds to a control device and the subchannel corresponds to a controlled device.

9. Instruction Cycle

The term instruction cycle refers to one cycle in which one microinstruction completes an execution. The term "machine cycle" refers to one cycle of reading out from the control memory. One machine cycle of the first type microinstruction comprises a plurality of machine cycles and one machine cycle of the second type microinstruction comprises one machine cycle.

What is claimed is:

1. A microprogram control device for time-shared control of a plurality of controlled devices each comprising a microinstruction decoder, a microinstruction test circuit, and a microinstruction execution request circuit, said device comprising:
- a control memory for storing microinstructions for controlling said plurality of controlled devices and for reading out said microinstructions in one machine cycle,
- a first microinstruction register for storing first type microinstructions read out of said control memory and controlling one controlled device over a plurality of machine cycles,
- a second microinstruction register for storing second type microinstructions read out of said control memory and controlling one controlled device in one machine cycle, and
- a microinstruction execution control circuit for receiving input signals consisting of microinstruction-execution-request signals from each of said microinstruction-execution-request circuits of said plurality of controlled devices, first signals from said first microinstructon register and second signals from said second microinstruction register,
- said microinstruction execution control circuit selecting said second microinstruction register and one controlled device controlled by control signals of said second microinstruction register, which is different from the controlled device then being controlled by said one of said first type microinstructions, when said input signals correspond to a given instruction that one of the first type microinstructions controls one controlled device in a certain machine cycle and then in the next machine cycle, and
- said microinstruction execution control circuit selecting one of said first and second microinstruction registers and one controlled device controlled by control signals of said selected register of the first and second microinstruction registers, when said input signals correspond to any instruction other than said given instruction,
- whereby one controlled device controlled by the control signals of said first microinstruction register and the other controlled device controlled by the control signals of said second microinstruction register are effectively controlled in parallel.

2. A microprogram control device as set forth in claim 1 wherein:
- said microinstruction execution control circuit further comprises a plurality of first microinstruction-execution-request hold circuits for said first microinstruction register corresponding to said plurality of controlled devices, and a plurality of second microinstruction hold circuits for said second microinstruction register corresponding to said plurality of controlled devices, and
- said first and second signals from said first and second microinstruction registers comprise an execution request signal for instructing continuous control of one currently controlled device to be controlled in and after the next machine cycle and a register selecting signal for instructing the transmission of a microinstruction read out of said control memory into one of said first and second microinstruction registers,
- said microinstruction execution control circuit transmitting a detected execution request signal to one of said first and second microinstruction-execution-request hold circuits which is designated by said register selecting signal and said currently controlled device, and selecting said one of said first and second microinstruction-execution-request hold circuits for storing said execution request signal in each machine cycle, whereby one controlled device is selected.

3. A microprogram control device as set forth in claim 2, wherein:
- the first and second signals from said first and second microinstruction registers each further comprise a stop request signal for designating the stop of the control of the controlled device which is currently controlled, when said microinstruction execution control circuit detects said stop request signal,
- said microinstruction execution control circuit stopping the execution of the next microinstruction after the execution of the microinstruction for said currently controlled device terminates, said microinstruction execution control circuit transmitting said execution request signal to said first and second microinstruction-execution-request hold circuits which are designated by said register selecting signal and said controlled circuits, when said microinstruction execution control circuit detects said execution request signal transmitted from said controlled device.

4. In a digital microcomputer which operates in a sequence of machine cycles, comprising:
- a central processing section comprising a central control unit and a main memory coupled thereto;
- a plurality of sub-channel devices for processing information from said memory in accordance with (i) instructions of a first type which are to be executed over a plurality of machine cycles and (ii) instructions of a second type which are to be executed during a single machine cycle, each instruction of either type being represented by a single digital word;
- a channel multiplexer common to all of said subchannel devices for periodically coupling each of said subchannel devices to said processing section for a predetermined time division interval and simultaneously providing corresponding instructions to the coupled one of said devices; and
- at least one input-output unit coupled to each of said subchannel devices, the improvement comprising:
- a control memory operatively associated with said multiplexer;
- a first microinstruction register coupled to said control memory for sequentially receiving instruction words, one at a time, of said first type, each of said words including the address of a selected one of said subchannel devices;
- a second microinstruction register coupled to said control memory for sequentially receiving instruction words, one at a time, of said second type, each of said second type instruction words including the address of said selected one of said subchannel devices;
- first and second decoding means within each of said subchannel devices for receiving and decoding said instruction words from said first and second registers respectively;

controlled means within each of said subchannel devices and coupled to the decoding means thereof for simultaneously carrying out one instruction of said second type and one step of one instruction of said first type, so that during a single time-division interval said controlled means completes at least one instruction of said first type and a plurality of instructions of said second type;

microinstruction execution control and selection means including a plurality of storage registers coupled to said processing section for receiving instruction words of said first and second types; and a preference circuit coupled between said storage registers and said control memory for transferring from said storage registers to said control memory (i) an instruction word of said first type and an instruction word of said second type and (ii) the address of a selected one of said subchannel controlled devices which is to execute said instruction words.

* * * * *

UNITED STATES PATENT OFFICE
CERTIFICATE OF CORRECTION

Patent No. 4,145,736    Dated  March 20, 1979

Inventor(s)   Takahiko Yamada, et al

It is certified that error appears in the above-identified patent and that said Letters Patent are hereby corrected as shown below:

In the Abstract, line 12: After "execution" insert --or stop--.

line 13: Delete "next" (1st occurrence).

Column 1, line 11: Change "portion" to --control--.

line 43: "the" should be --a--; "a" should be --the--.

Column 3, line 4: "C" should be --(C)--.

line 5: Change "common data channel parts" to --common parts of data channel--.

line 20: Change "counter" to --computer--.

line 61: Delete "each".

Column 4, line 12: Change "such" to --type--.

line 56: Change "selected" to --selection--.

Column 5, line 8: Change "1 linterface" to --interface--.

Column 6, line 23: Change "request" to --execution--.

line 25: After "instruction" insert --register 65--.

Column 7, line 20: Change "request is" to --requests are--.

line 24: Change "an instruction" to --the preceding first type microinstruction--.

UNITED STATES PATENT OFFICE
CERTIFICATE OF CORRECTION

Patent No. 4,145,736   Dated March 20, 1979

Inventor(s) Takahiko Yamada, et al

It is certified that error appears in the above-identified patent and that said Letters Patent are hereby corrected as shown below:

Column 7, line 26: Change "first type" to --next first type--.

line 30: Change 'logical state "1"' to --logical state "0"--.

line 33: Change "because" to --so that--.

line 36: Change "the second type instruction" to --the preceding first type instruction--.

line 21: Change "112 -114." to --112 - 114 so that the execution of the first type microinstruction is preferred over the execution of the second type microinstruction.--.

lines 36 - 38: Delete "The execution of the first type microinstruction is preferred over the execution of the second type microinstruction."

Column 11, line 23: Change "55b" to --55B--.

line 53: Change "Fig. 14" to --Fig. 12 and Fig. 14--.

Column 8, line 12: Change "86" to --186--.

line 14: Change "171" to --172--.

Column 12, line 51: Change "second" to --first--.

line 58: Change "55" to --55C--.

line 62: Change "$t_{99}$" to --$t_{94}$--.

UNITED STATES PATENT OFFICE
CERTIFICATE OF CORRECTION

Patent No. 4,145,736         Dated   March 20, 1979

Inventor(s)   Takahiko Yamada, et al

It is certified that error appears in the above-identified patent and that said Letters Patent are hereby corrected as shown below:

Column 12, line 65:   Change "O" to --0--.

Column 13, line 7:   Change "$T_{94}$" to --$t_{94}$--.

line 60:   Change "top" to --start--.

line 67:   Change "top" to --start--.

Column 14, line 7:   Change "contet" to --content--.

line 47:   Change "45" to --47--.

line 48:   Change "160 and 166" to --166 and 160--.

line 64:   Change "when" to --assuming--.

lines 67-68:   Change "connected to other circuits" to --respectively connected to circuits whose constructions are different from each other--.

Column 15, line 5:   Cancel "the" (2nd occurrence).

Column 16, line 18:   Change "microtestinstruction" to --microinstruction--.

lines 44-46:   Delete "and since the opening. . .with the access time."

line 44:   Change the comma to a period.

line 58:   Change "mulitplexer" to --multiplexer--.
(Second occurrence only)
lines 65 & 67: / Change "machine" to --instruction--.

UNITED STATES PATENT OFFICE
CERTIFICATE OF CORRECTION

Patent No. 4,145,736                     Dated March 20, 1979

Inventor(s) Takahiko Yamada, et al

It is certified that error appears in the above-identified patent and that said Letters Patent are hereby corrected as shown below:

In the Drawing:

Fig. 2: "MULTIPLEX" should read --MULTIPLEXER--.

Fig. 4, Element 30, "EXECTION" should read --EXECUTION-

Element 28: "MICRO" should read --MICRO- --.

Element 32: "CONTROLED" should read --CONTROLLED--.

Element 38ℓ: "OUT-PUT" should read --OUTPUT--.

Element 36: "DECODER" should read --TEST CIRCUIT--.

Element 37: "DECODER" should read --TEST CIRCUIT--.

Fig. 5D, the line to the right-hand end of box 47 should have an arrowhead pointing to the box.

Fig. 5A, Element 59: "SOLT" should read --SLOT--.

Fig. 5C, that portion appearing as

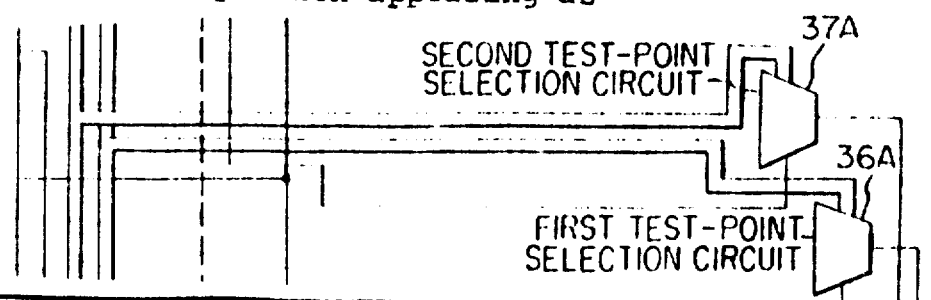

UNITED STATES PATENT OFFICE
CERTIFICATE OF CORRECTION

Patent No. 4,145,736        Dated March 20, 1979

Inventor(s) Takahiko Yamada, et al

It is certified that error appears in the above-identified patent and that said Letters Patent are hereby corrected as shown below:

Fig. 5C continued: should appear as

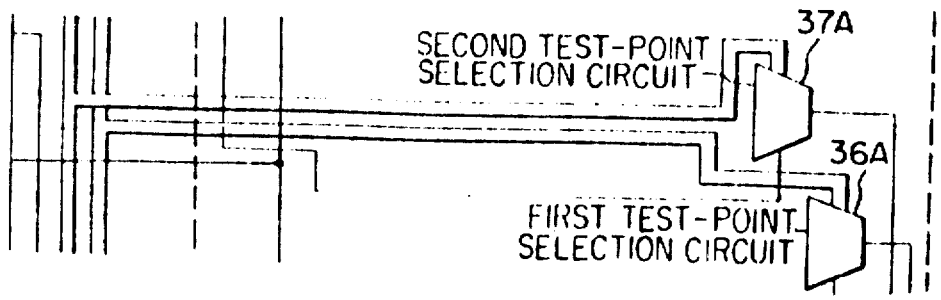

that portion appearing as

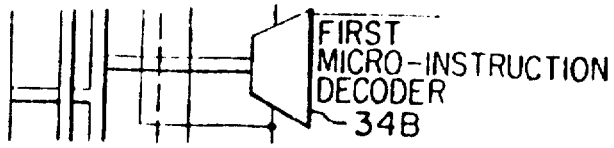

should appear as

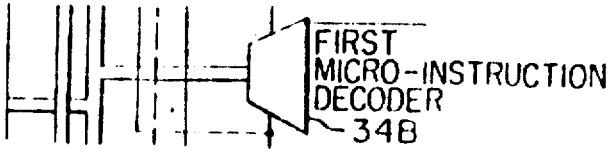

Fig. 6, No. 3: "AND" should read --NAND--.

"$\bar{A} + B$" should read --$\bar{A} \cdot B$--.

No. 7: "III" should read --II--.

UNITED STATES PATENT OFFICE
CERTIFICATE OF CORRECTION

Patent No. 4,145,736                 Dated  March 20, 1979

Inventor(s)    Takahiko Yamada, et al

It is certified that error appears in the above-identified patent and that said Letters Patent are hereby corrected as shown below:

Fig. 7E, the reference number --186-- should be applied to the OR gate appearing to the right of AND gates 171-173.

Figure 7A:
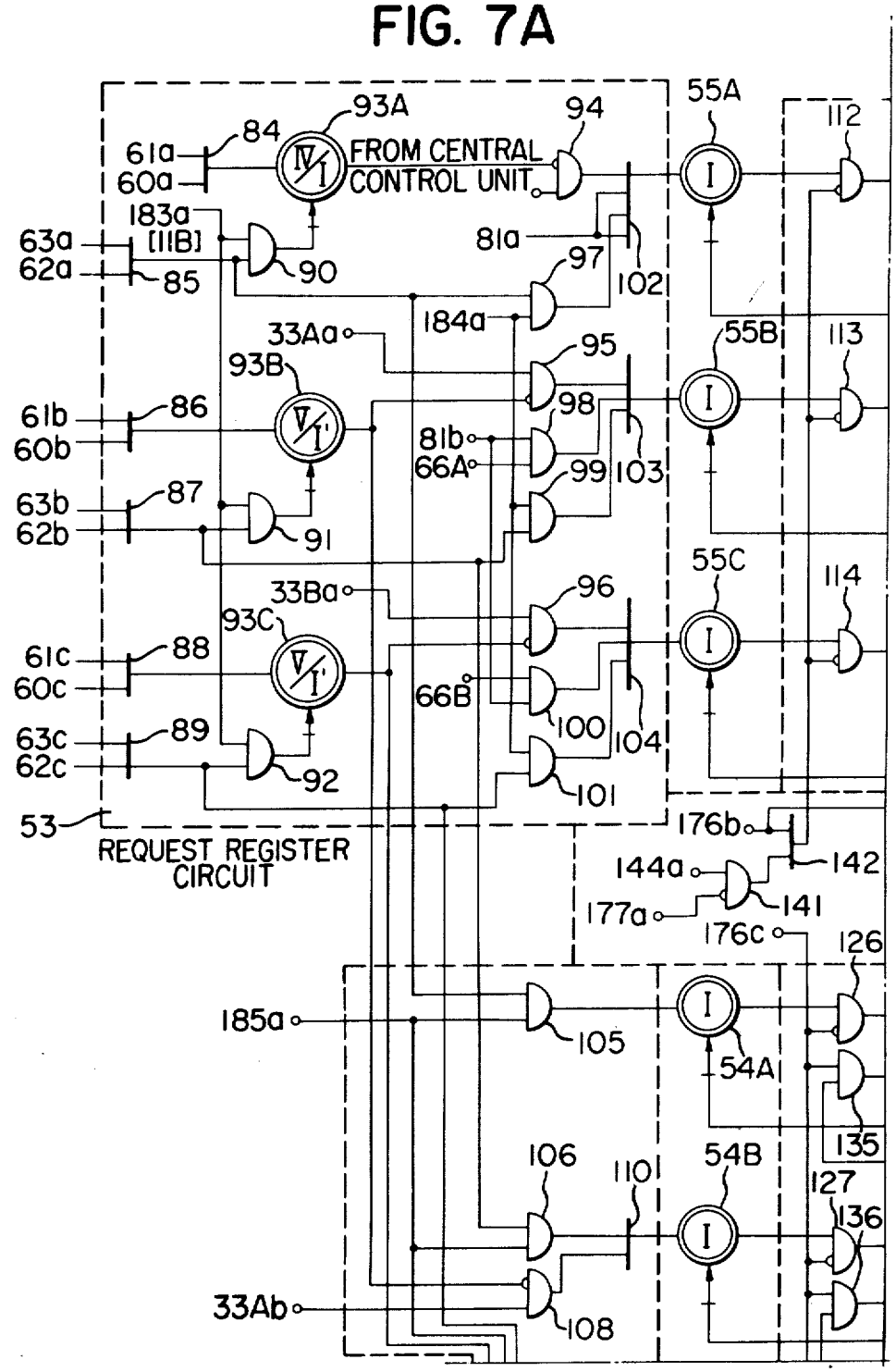
FIG. 7, representative of FIGS. 7A–7E is a further detailed block diagram of some circuits shown in FIG. 5.

Fig. 7A, the reference numeral --84a-- should be applied to the signal line from OR gate "84" to hold flip-flop "93A"; the reference numeral --86a-- should be applied to the signal line from OR gate "86" to hold flip-flop "93B"; the reference numeral --88a-- should be applied to the signal line from OR gate "88" to hold flip-flop "93C".

Fig. 8, "$t_S2$" should read --$t_S3$--; "$t_S4$" should read --$t_S4$--; "$t_S6$" should read --$t_S6$--; "$t_S5$" should read --$t_S5$--; "$t_S7$" should read --$t_S7$--; "1st" should read --2nd--; "28" on the "1st MICROINSTRUCTION" line should read --27--; "47" should read --45--; the reference numeral --47-- should be applied to the unlabelled line immediately below the line originally labelled "47" (now labelled "45").

Figure 11:
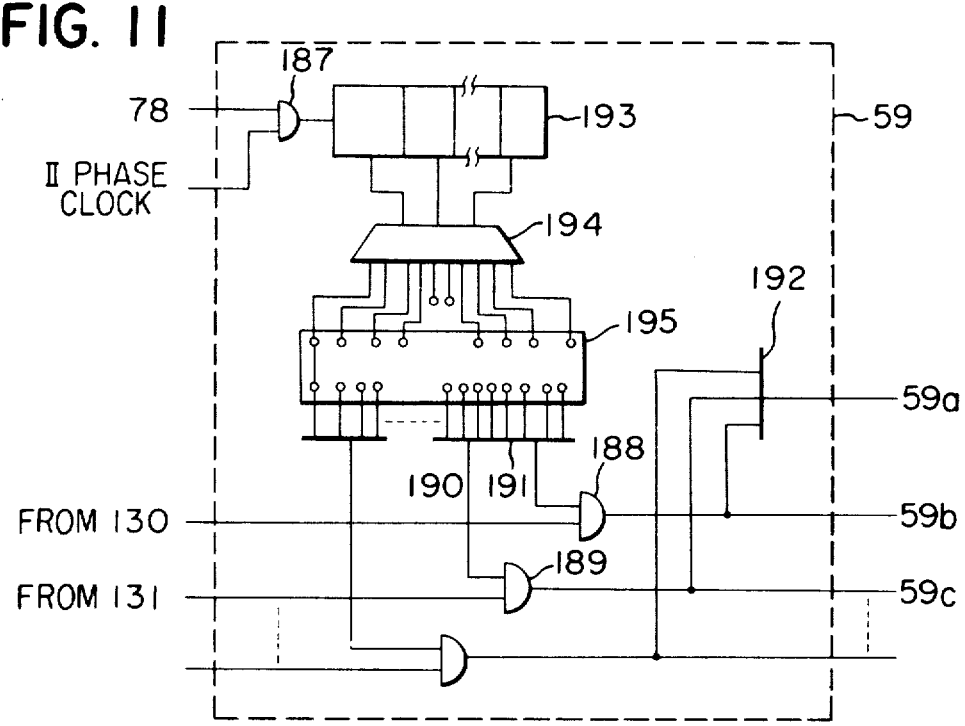
FIG. 11 is a detailed circuit diagram of a time-slot allocation circuit.

Fig. 11, that portion appearing as

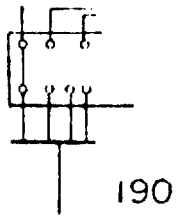

should appear as

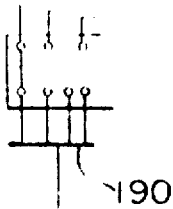

UNITED STATES PATENT AND TRADEMARK OFFICE
CERTIFICATE OF CORRECTION

PATENT NO. : 4,145,736

DATED : March 20, 1979

INVENTOR(S) : Takahiko Tamada, et al

Figure 7B:
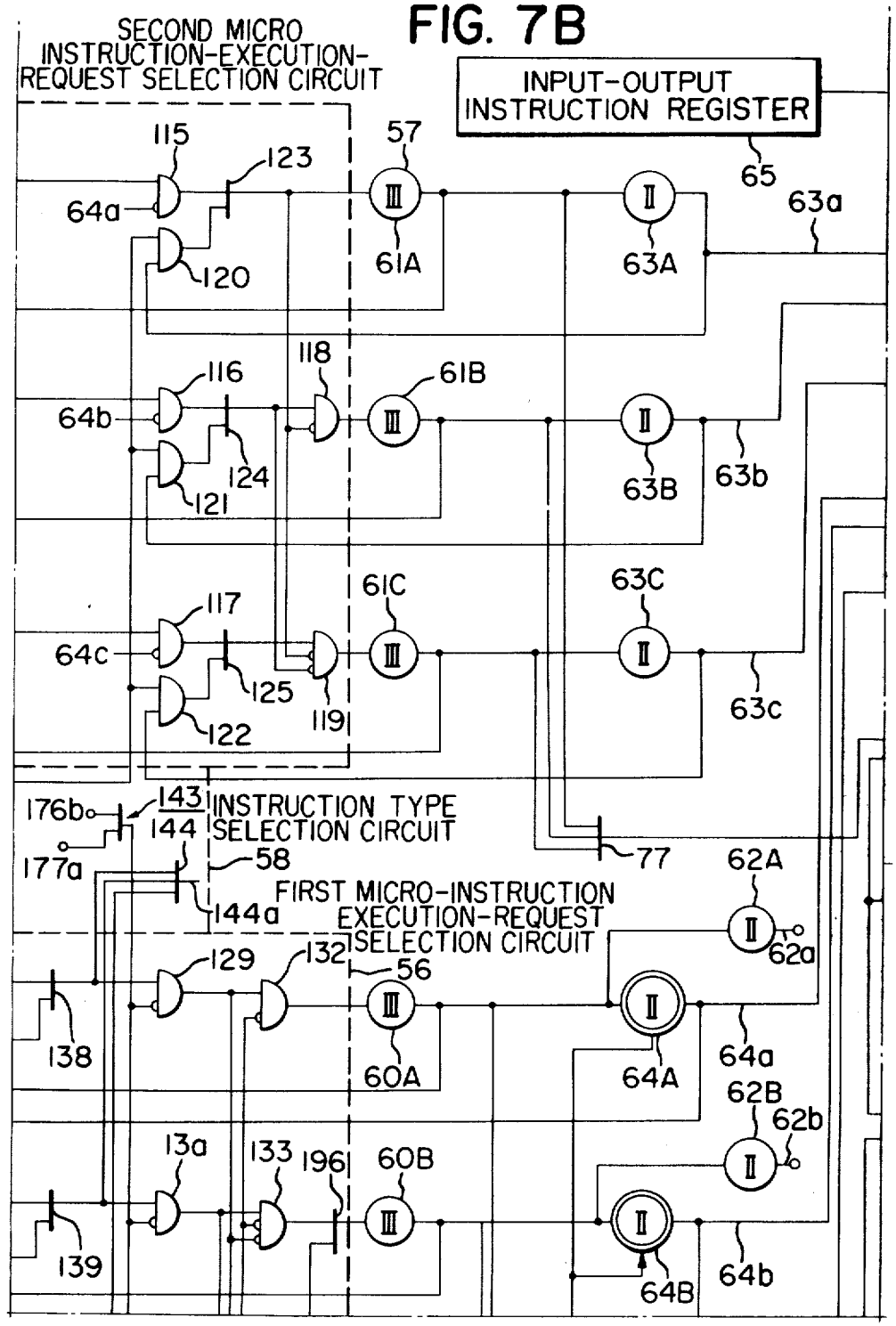
Figure 7C:
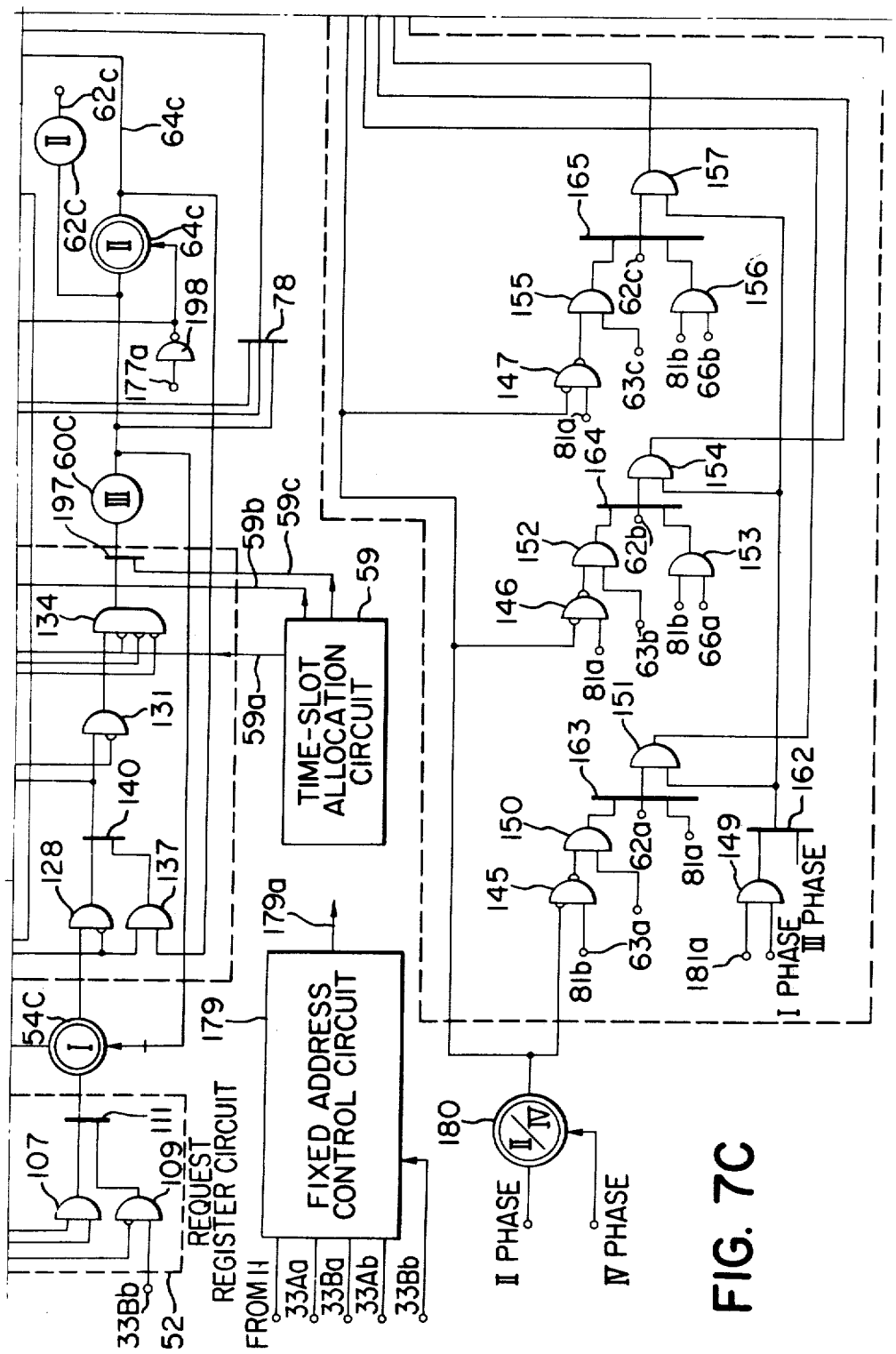
Figure 7D:
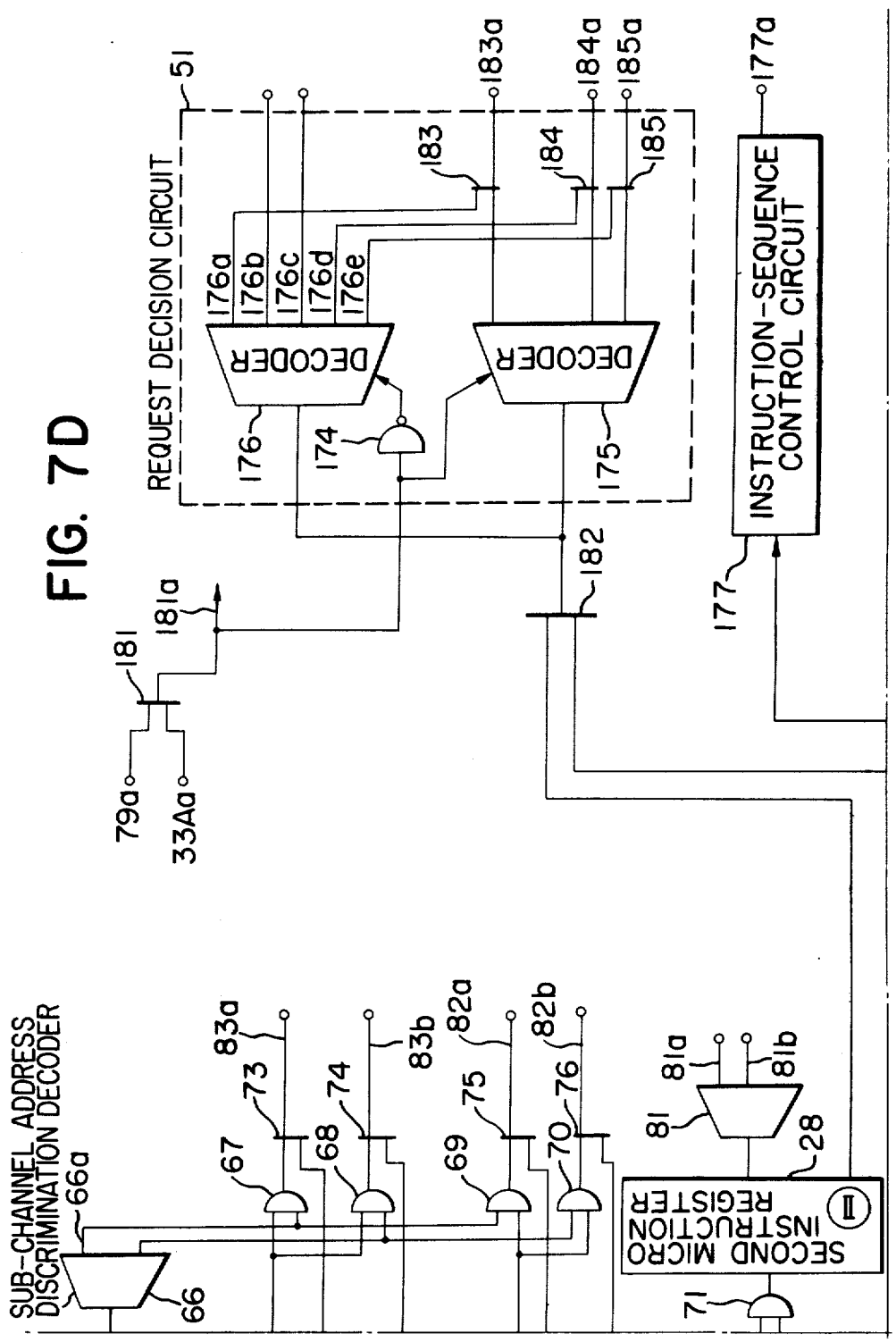

It is certified that error appears in the above—identified patent and that said Letters Patent is hereby corrected as shown below:

Fig. 7B should appear as follows:

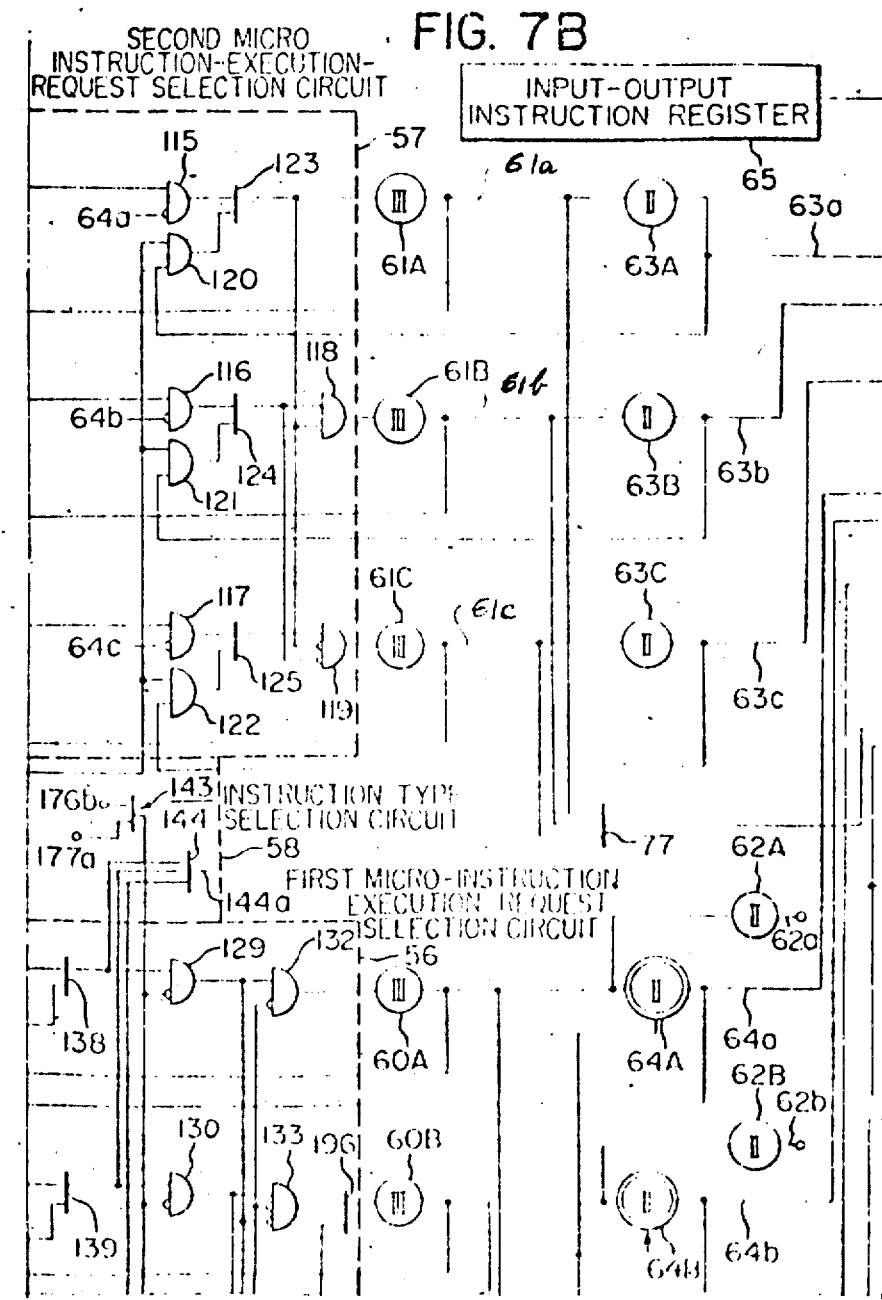

UNITED STATES PATENT OFFICE
CERTIFICATE OF CORRECTION

Patent No. 4,145,736  Dated  March 20, 1979

Inventor(s) Takahiko Yamada, et al

It is certified that error appears in the above-identified patent and that said Letters Patent are hereby corrected as shown below:

Fig. 12, "$N_i$" should read --$N_1$--; "$N_0$" (lower right corner block only) should read --$N_1$--.

Fig. 12, (Upper left block) "Microinsturuction" should read --Microinstruction--.

Fig. 13, "$t_{74}$" on the same line as "$t_{73}$" should read --$t_{72}$--.

Fig. 14 should appear as follows:

UNITED STATES PATENT OFFICE
CERTIFICATE OF CORRECTION

Patent No. 4,145,736          Dated March 20, 1979

Inventor(s) Takahiko Yamada, et al

It is certified that error appears in the above-identified patent and that said Letters Patent are hereby corrected as shown below:

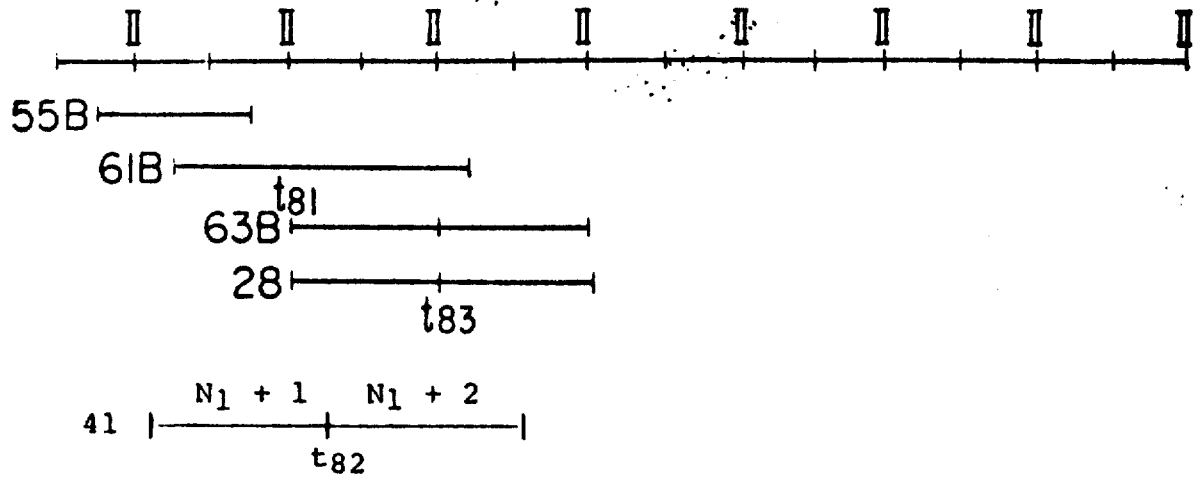

Signed and Sealed this

Seventh Day of September 1982

[SEAL]

Attest:

GERALD J. MOSSINGHOFF

Attesting Officer    Commissioner of Patents and Trademarks